(12) United States Patent
Nishi

(10) Patent No.: US 8,750,136 B2
(45) Date of Patent: Jun. 10, 2014

(54) MONITORING APPARATUS AND MONITORING METHOD

(75) Inventor: Tetsuya Nishi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 412 days.

(21) Appl. No.: 13/220,876

(22) Filed: Aug. 30, 2011

(65) Prior Publication Data

US 2012/0093004 A1    Apr. 19, 2012

(30) Foreign Application Priority Data

Oct. 15, 2010   (JP) ................................ 2010-233091

(51) Int. Cl.
*G01R 31/08* (2006.01)

(52) U.S. Cl.
USPC .......... 370/248; 370/216; 370/242; 370/247; 370/251

(58) Field of Classification Search
USPC .................. 370/216, 242, 247, 248, 251, 252
See application file for complete search history.

(56) References Cited

U.S. PATENT DOCUMENTS

| 7,606,896 | B2 | 10/2009 | Kobayashi |
| 7,768,928 | B2 | 8/2010 | Harel et al. |
| 2007/0060186 | A1* | 3/2007 | Ganesan et al. ............... 455/522 |
| 2009/0052343 | A1* | 2/2009 | Kobayashi .................... 370/253 |

FOREIGN PATENT DOCUMENTS

| JP | 2006-238052 A | 9/2006 |
| JP | 2009-543500 A | 12/2009 |

* cited by examiner

*Primary Examiner* — Kibrom T Hailu
*Assistant Examiner* — Zewdu A Beyen
(74) *Attorney, Agent, or Firm* — Fujitsu Patent Center

(57) ABSTRACT

The monitoring method includes: detecting a cut link among a plurality of links forming a link aggregation; counting lost packets related to remaining links in the plurality of links excluding the cut link to obtain a first lost packet count for each first address included in packets passed through the remaining links; sorting the first lost packet counts into first segments corresponding to the remaining links; determining degradation in quality for each first segment on the basis of the first lost packet counts sorted into the first segments; determining whether the cut link is in failure on the basis of the determined degradation in quality for each first segment; and outputting a determination result of whether the cut link is in failure.

18 Claims, 23 Drawing Sheets

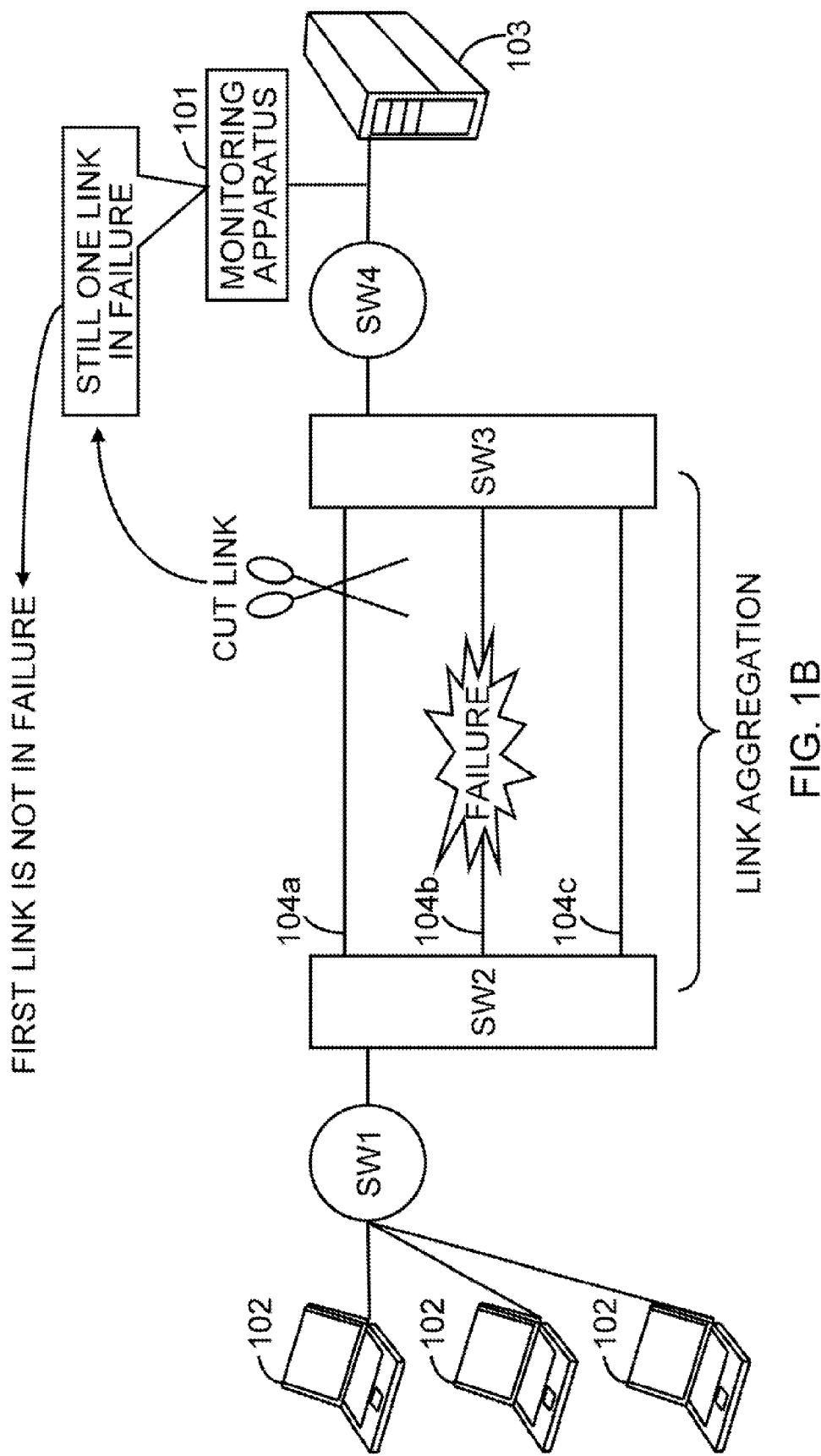

202a

| SOURCE MAC ADDRESS | DESTINATION MAC ADDRESS | PASSED PACKET COUNT | LOST PACKET COUNT | QUALITY ANALYSIS |
|---|---|---|---|---|
| aa:bb:cc:dd:ee:00 | aa:bb:cc:ff:gg:01 | 10000 | 100 | DEGRADED |
| ff:gg:hh:ii:jj:01 | aa:bb:cc:ff:gg:01 | 9000 | 0 | NORMAL |
| ... | ... | ... | ... | ... |
| aa:gg:cc:ii:jj:07 | aa:bb:cc:ff:gg:01 | 10500 | 0 | NORMAL |
| aa:gg:cc:ii:jj:08 | aa:bb:cc:ff:gg:08 | 8000 | 100 | DEGRADED |
| ... | ... | ... | ... | ... |

FIG. 3

| Modulo(n) OF SOURCE MAC ADDRESS | PASSED PACKET COUNT | LOST PACKET COUNT | QUALITY DEGRADATION |
|---|---|---|---|
| 0 | 10000 | 100 | DEGRADED |
| 1 | 9000 | 0 | NORMAL |
| ... | ... | ... | ... |
| n-1 | 9500 | 0 | NORMAL |

| Modulo(n) OF SOURCE MAC ADDRESS | PASSED PACKET COUNT | LOST PACKET COUNT | QUALITY DEGRADATION |
|---|---|---|---|
| 0 | 10000 | 100 | DEGRADED |
| 1 | 9000 | 0 | NORMAL |
| ... | ... | ... | ... |
| n-1 | 9500 | 0 | NORMAL |

FIG. 10B

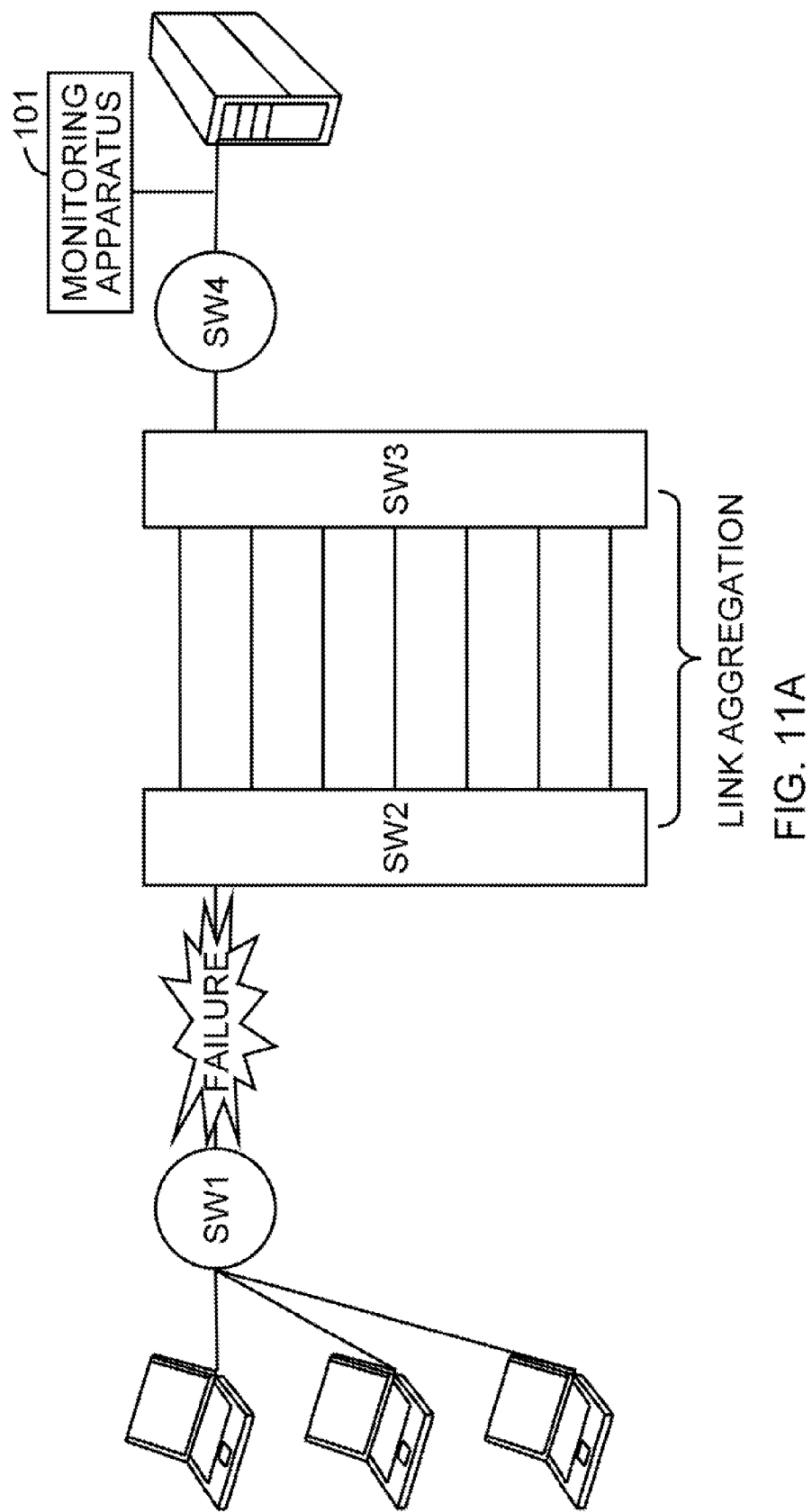

| Modulo(n) OF SOURCE MAC ADDRESS | PASSED PACKET COUNT | LOST PACKET COUNT | QUALITY DEGRADATION |
|---|---|---|---|
| 0 | 10000 | 100 | DEGRADED |
| 1 | 9000 | 100 | DEGRADED |
| ... | ... | ... | ... |
| n-1 | 9500 | 100 | DEGRADED |

| Modulo(n) OF SOURCE MAC ADDRESS | PASSED PACKET COUNT | LOST PACKET COUNT | QUALITY DEGRADATION |
|---|---|---|---|
| 0 | 10000 | 100 | DEGRADED |
| 1 | 9000 | 0 | NORMAL |
| ... | ... | ... | ... |
| n-1 | 9500 | 0 | NORMAL |

202b ↗  
1 FAILURE LINK (DEGRADED, NORMAL)

⇒

| Modulo(n) OF SOURCE MAC ADDRESS | PASSED PACKET COUNT | LOST PACKET COUNT | QUALITY DEGRADATION |
|---|---|---|---|
| 0 | 10000 | 100 | DEGRADED |
| 1 | 9000 | 0 | NORMAL |
| ... | ... | ... | ... |
| n-2 | 9500 | 0 | NORMAL |

202b ↗  
1 FAILURE LINK (DEGRADED, NORMAL)

FIG. 13B

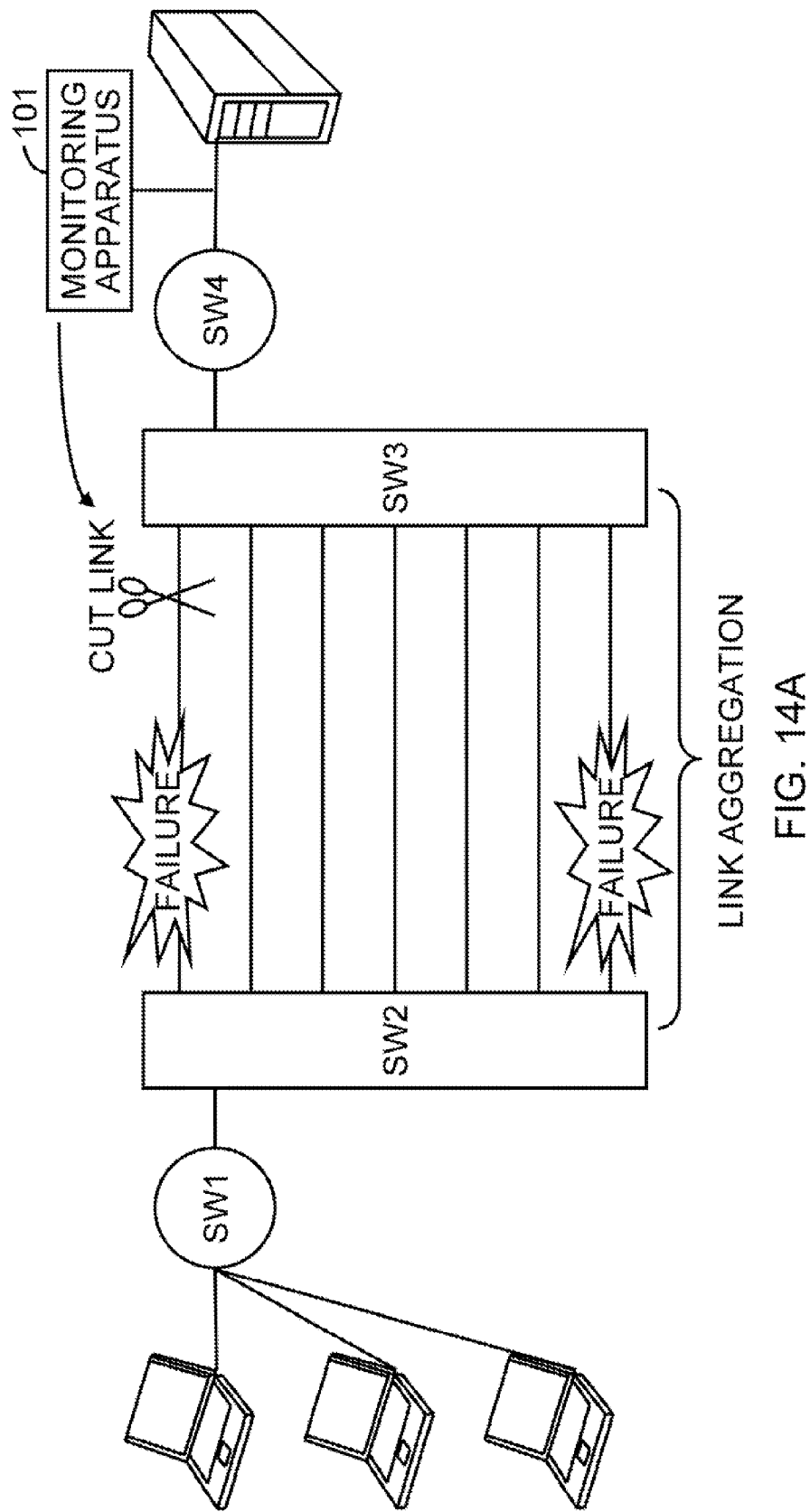

| Modulo(n) OF SOURCE MAC ADDRESS | PASSED PACKET COUNT | LOST PACKET COUNT | QUALITY DEGRADATION |
|---|---|---|---|
| 0 | 10000 | 100 | DEGRADED |
| 1 | 9000 | 0 | NORMAL |
| ... | ... | ... | ... |
| n-1 | 9500 | 100 | DEGRADED |

202b, 2 FAILURE LINKS

| Modulo(n) OF SOURCE MAC ADDRESS | PASSED PACKET COUNT | LOST PACKET COUNT | QUALITY DEGRADATION |
|---|---|---|---|
| 0 | 10000 | 0 | NORMAL |
| 1 | 9000 | 0 | NORMAL |
| ... | ... | ... | ... |
| n-2 | 9500 | 100 | DEGRADED |

202b, 1 FAILURE LINK

FIG. 14B

| Modulo(n) OF SOURCE MAC ADDRESS | PASSED PACKET COUNT | LOST PACKET COUNT | QUALITY DEGRADATION |
|---|---|---|---|
| 0 | 10000 | 100 | DEGRADED |
| 1 | 9000 | 0 | NORMAL |
| ... | ... | ... | ... |
| n-1 | 9500 | 100 | DEGRADED |

202b ↗, 2 FAILURE LINKS (DEGRADED rows)

⇒

| Modulo(n) OF SOURCE MAC ADDRESS | PASSED PACKET COUNT | LOST PACKET COUNT | QUALITY DEGRADATION |
|---|---|---|---|
| 0 | 10000 | 100 | DEGRADED |
| 1 | 9000 | 0 | NORMAL |
| ... | ... | ... | ... |
| n-2 | 9500 | 100 | DEGRADED |

202b ↗, 2 FAILURE LINKS (DEGRADED rows)

FIG. 15B

MONITORING APPARATUS AND MONITORING METHOD

CROSS-REFERENCE TO RELATED APPLICATION

This application is based upon and claims the benefit of priority of the prior Japanese Patent Application No. 2010-233091, filed on Oct. 15, 2010, the entire contents of which are incorporated herein by reference.

FIELD

The embodiments discussed herein are related to a monitoring apparatus and a monitoring method.

BACKGROUND

In recent years, Ethernet (registered trademark) is built as a protocol lower than an internet protocol (IP) network for each sub-network connection between a corporate server and a client in order to build the IP network. In general, Ethernet is built by connecting a plurality of layer 2 or layer 3 switches each of which switches a packet on the basis of a media access control (MAC) address.

In Ethernet, a link aggregation technique is employed in which a plurality of links are treated as one virtual link so that the links have broadband features and redundancy. Specifically, since a channel capacity of a link aggregation is a sum of channel capacities of plural links, the broadband features may be obtained. Further, even if some of the plural links are broken, a switch automatically allots packets to other links for continuing communication, so that the redundancy may be achieved.

If a failure occurs on a link and quality of a packet is degraded, it is necessary to exactly identify on which link (referred to as a failure link) the failure occurs so as to maintain a network.

In order to identify a failure link, a network tomography technique is ordinarily employed. According to the network tomography technique, a monitoring apparatus connected to the network is provided to capture a packet which passes through the network. The monitoring apparatus captures a plurality of packets, and measures quality of each packet to diagnose quality degradation. The monitoring apparatus learns a link that a packet passes through by using a routing protocol. Then, the monitoring apparatus makes a table in which whether packet quality is degraded or not is mapped for each link that the packets pass through. The monitoring apparatus identifies a link such that each packet which passes through the link suffers from quality degradation as a failure link.

Japanese Laid-open Patent Publications No. 2009-543500 and No. 2006-238052 disclose related techniques

SUMMARY

According to an aspect of the present invention, provided is a computer-readable, non-transitory recording medium storing a program that causes a computer to execute a monitoring method. The monitoring method includes: detecting a cut link among a plurality of links forming a link aggregation; counting lost packets related to remaining links in the plurality of links excluding the cut link to obtain a first lost packet count for each first address included in packets passed through the remaining links; sorting the first lost packet counts into first segments corresponding to the remaining links; determining degradation in quality for each first segment on the basis of the first lost packet counts sorted into the first segments; determining whether the cut link is in failure on the basis of the determined degradation in quality for each first segment; and outputting a determination result of whether the cut link is in failure.

The object and advantages of the invention will be realized and attained by means of the elements and combinations particularly pointed out in the claims. It is to be understood that both the foregoing general discussion and the following detailed discussion are exemplary and explanatory and are not restrictive of the invention, as claimed.

BRIEF DESCRIPTION OF DRAWINGS

FIGS. 1A to 1C are diagrams illustrating how to identify a failure link in a link aggregation according to an embodiment of the present invention;

FIG. 3 is a diagram illustrating an exemplary data format of a measured data table according to an embodiment of the present invention;

FIG. 4 is a diagram illustrating an exemplary data format of a sorted data table according to an embodiment of the present invention;

FIGS. 10A and 10B are diagrams illustrating an exemplary process in which a monitoring apparatus determines whether a failure has occurred in a link aggregation according to an embodiment of the present invention;

FIGS. 11A and 11B are diagrams illustrating an exemplary process in which a monitoring apparatus determines whether a failure has occurred in a link aggregation according to an embodiment of the present invention;

FIGS. 13A and 13B are diagrams illustrating an exemplary process in which a monitoring apparatus identifies which link in the link aggregation is in failure according to an embodiment of the present invention;

FIGS. 14A and 14B are diagrams illustrating an exemplary process in which a monitoring apparatus identifies which links in the link aggregation are in failure according to an embodiment of the present invention; and FIGS. 15A and 15B are diagrams illustrating an exemplary process in which a monitoring apparatus identifies which links in the link aggregation are in failure according to an embodiment of the present invention.

DESCRIPTION OF EMBODIMENTS

The monitoring apparatus may learn a fact that a packet passes through a switch employing a link aggregation by using a routing protocol, however, the monitoring apparatus mentioned above may be unable to learn which link the packet passes through. Thus, there is a problem in that, although the monitoring apparatus may detect a failure occurrence in a link aggregation, the monitoring apparatus may not specifically identify which link is in failure.

Accordingly, it is preferable to provide a monitoring apparatus and a monitoring method for enhancing precise identification of a failure link existing in a link aggregation.

According to the embodiments, an effect is produced in that precise identification of a failure link existing in a link aggregation may be enhanced.

A monitoring apparatus and a monitoring method according to the embodiments will be discussed in detail below with reference to the drawings.

How to identify a failure link in a link aggregation will be discussed with reference to FIGS. 1A to 1C.

Figure 1A:
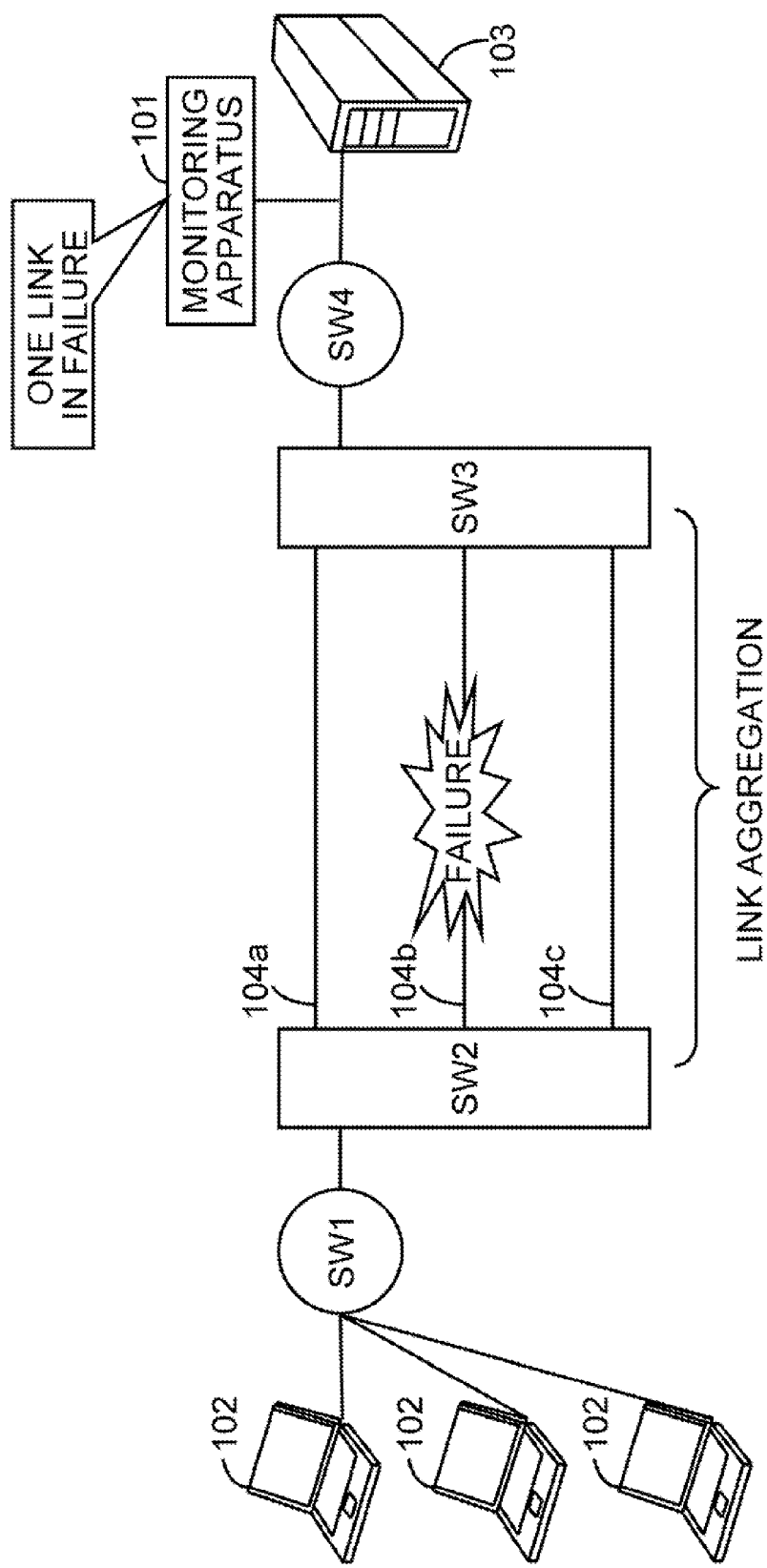
Figure 1C:
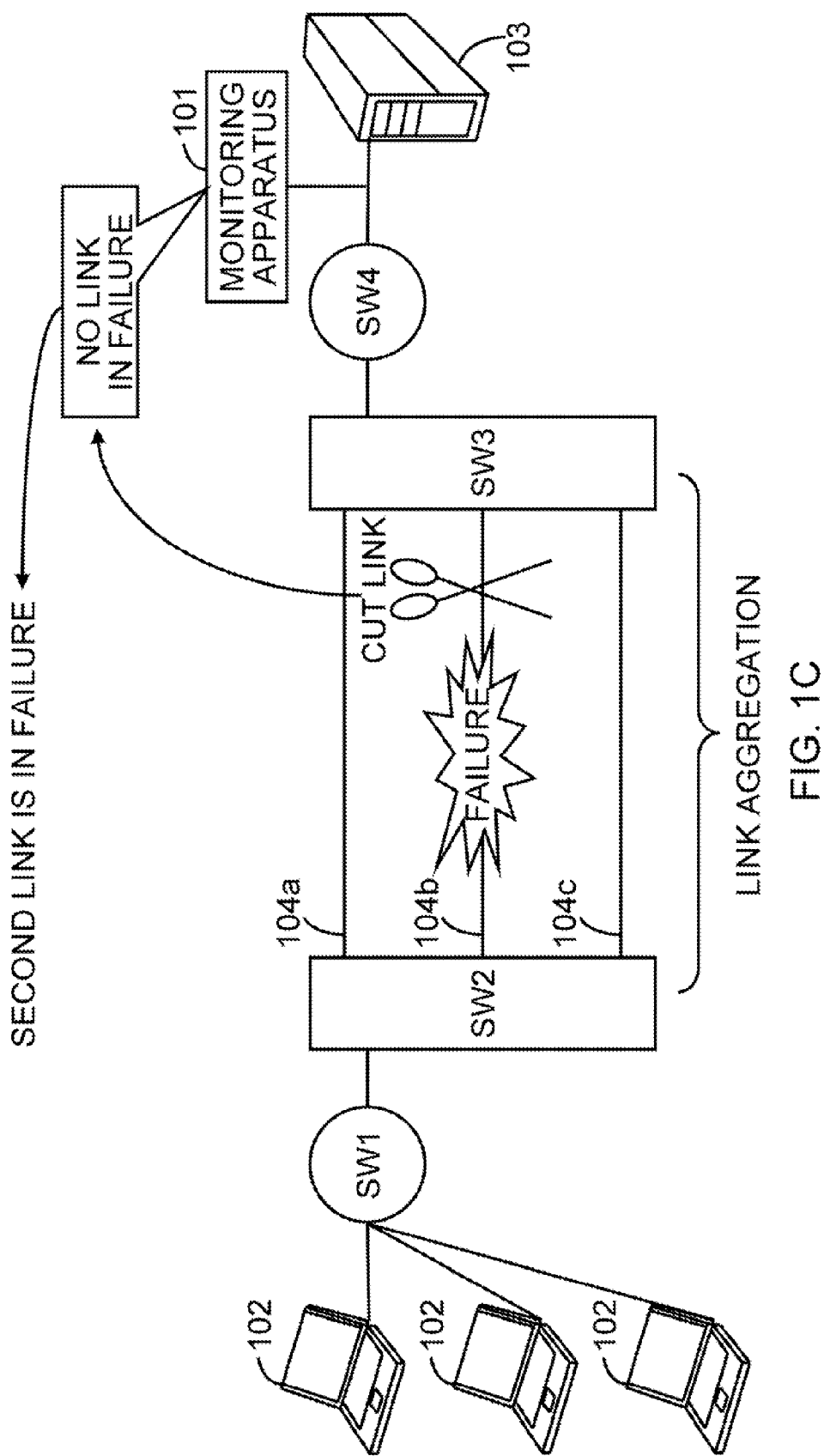

FIGS. 1A to 1C illustrate how to identify a failure link in a link aggregation according to the present embodiment.

In a network illustrated in FIG. 1A, a plurality of (three, for example, in FIG. 1A) personal computers (PCs) 102 communicate with a server 103. Specifically, each of the PCs 102 and a switch SW1 are connected with each other through one link, and so are the switch SW1 and a switch SW2, a switch SW3 and a switch SW4, and the switch SW4 and the server 103. The switch SW2 and the switch SW3 are connected with each other through a link aggregation. The three links forming the link aggregation are a link 104a, a link 104b and a link 104c, respectively, from top to bottom.

A monitoring apparatus 101 is connected between the switch SW4 and the server 103, captures a packet transmitted between the switch SW4 and the server 103, and extracts a source MAC address from the captured packet. The monitoring apparatus 101 counts the number of captured packets for each source MAC address as a packet count (referred to as a passed packet count) in a passed packet group. Further, the monitoring apparatus 101 detects a lost packet for each source MAC address, and counts the number of lost packets as a packet count (referred to as a lost packet count) in a lost packet group. The monitoring apparatus 101 determines the number of failure links on the basis of the passed packet count, the lost packet count and the source MAC address.

Specifically, the monitoring apparatus 101 checks a lack in an identity (ID) field of an IP packet so as to detect a lost packet, and counts the number of detected lost packets as the lost packet count. The monitoring apparatus 101 may check a lack in a sequence number of a transmission control protocol (TCP) packet so as to detect a lost packet. When the network adopts a user datagram protocol (UDP), the monitoring apparatus 101 may check a lack in a sequence number of a real-time transport protocol (RTP) packet so as to detect a lost packet.

A case where a failure occurs on the second upper link 104b in the link aggregation will be discussed here. The monitoring apparatus 101 determines whether a failure has occurred in the link aggregation through a process discussed later with reference to FIG. 8.

Upon determining that a failure has occurred in the link aggregation, the monitoring apparatus 101 determines the number of failure links. The monitoring apparatus 101 determines in this case that the number of failure links is one.

The monitoring apparatus 101 instructs the switch SW2 to cut one of the links in the link aggregation so as to identify which link in the link aggregation is in failure. The monitoring apparatus 101 determines the number of failure links after cutting the link. If the number of failure links is zero after the link cut, the monitoring apparatus 101 determines that the link having been cut is in failure.

As illustrated in FIG. 1B, it is supposed that the monitoring apparatus 101 instructs the switch SW2 to cut the first upper link 104a. Upon receiving the instruction, the switch SW2 cuts the first link 104a. The monitoring apparatus 101 may instruct the switch SW3 to cut the link.

The switch SW2 allots packets transmitted from the respective PCs 102 to the remaining two links in accordance with an allotment rule. A first allotment rule is as follows: divide a least significant byte of a source MAC address of a packet by the number of links in the link aggregation, and allot the packet to a link corresponding to the remainder. The monitoring apparatus 101 is unable to know to which link the switch SW2 allots each packet transmitted from the respective PCs 102.

Since the first link 104a having been cut is not in failure, the remaining two links include the link 104b in failure. Thus, some of the packets transmitted from the respective PCs 102 passes through the link 104b, resulting in quality degradation of the packet.

Thus, the monitoring apparatus 101 is supposed to determine that the number of failure links is still one after the link cut. Since the number of failure links does not change after the first link 104a is cut, the monitoring apparatus 101 may determine that the first link 104a is not involved in the quality degradation. That is, the monitoring apparatus 101 may determine that one of the remaining links is in failure, not the first link 104a having been cut.

As illustrated in FIG. 1C, it is supposed that the monitoring apparatus 101 instructs the switch SW2 to cut the second upper link 104b. Upon receiving the instruction, the switch SW2 cuts the second link 104b. The switch SW2 allots packets transmitted from the respective PCs 102 to the remaining two links in accordance with the first allotment rule. The monitoring apparatus 101 is unable to know to which link the switch SW2 allots each packet transmitted from the respective PCs 102.

Since the second link 104b having been cut is in failure, the remaining two links do not include a failure link. Thus, each packet transmitted from the respective PCs 102 passes through a normal link which is not in failure, so as not to cause quality degradation of the packet.

Thus, the monitoring apparatus 101 is supposed to determine that the number of failure links is zero after the link cut. Since the failure link disappears after the second link 104b is cut, the monitoring apparatus 101 may determine that the second link 104b caused the quality degradation. That is, the monitoring apparatus 101 may identify that the second link 104b having been cut is in failure.

The switch SW2 may adopt a second allotment rule as follows: divide a least significant byte of a destination MAC address of a packet by the number of links in the link aggregation, and allot the packet to a link corresponding to the remainder. The switch SW2 may also adopt a third allotment rule as follows: divide an exclusive logical sum of the least significant bytes of the source and destination MAC addresses of a packet by the number of links in the link aggregation, and allot the packet to a link corresponding to the remainder.

A hardware configuration of the monitoring apparatus 101 will be discussed with reference to FIG. 2.

Figure 2:
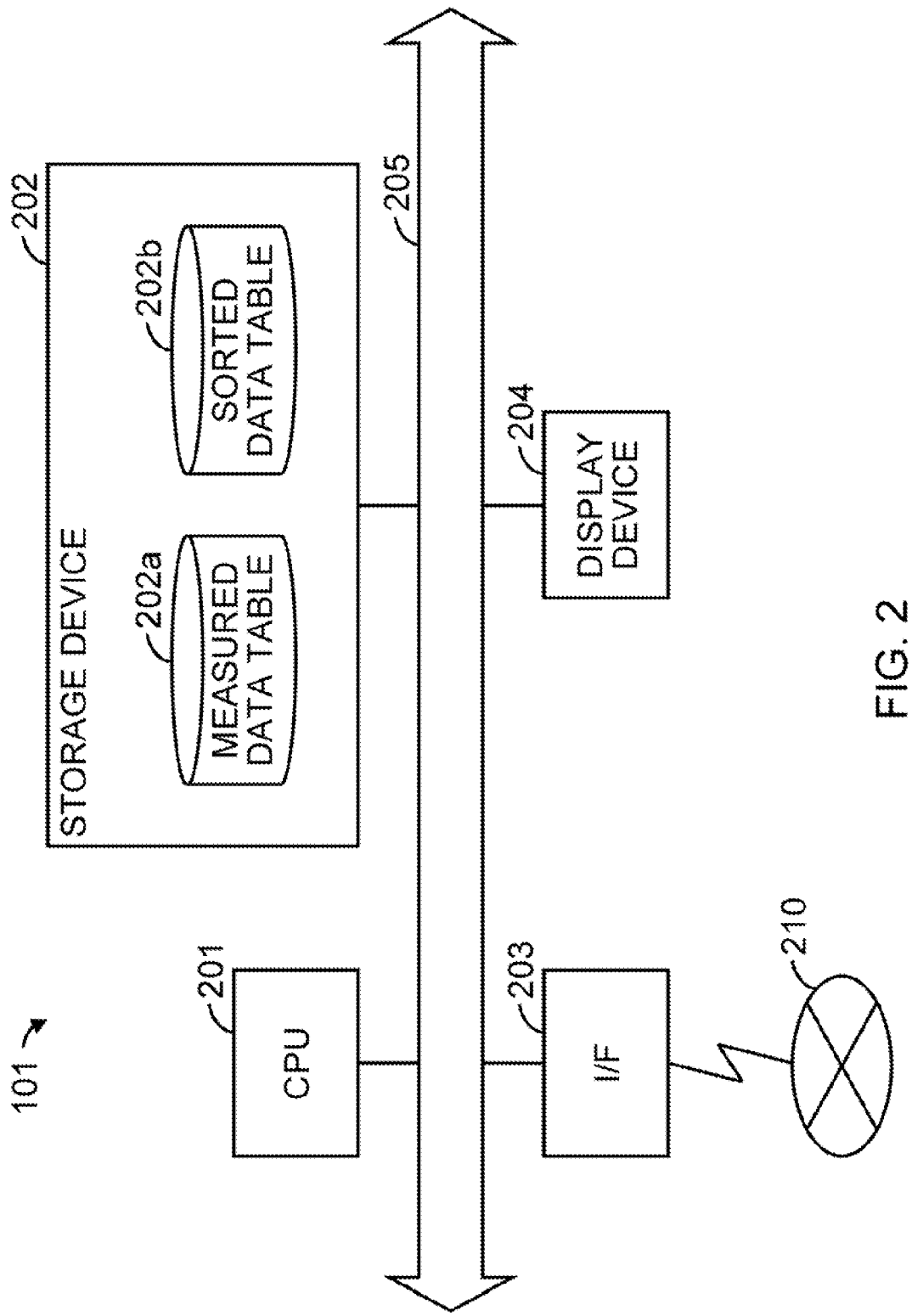
FIG. 2 is a diagram illustrating an exemplary hardware configuration of a monitoring apparatus according to an embodiment of the present invention.

FIG. 2 illustrates an exemplary hardware configuration of the monitoring apparatus 101 according to the present embodiment. The monitoring apparatus 101 illustrated in FIG. 2 includes a central processing unit (CPU) 201, a storage device 202, an interface (I/F) 203 and a display device 204. These components are connected to one another by a bus 205.

The CPU 201 entirely controls the monitoring apparatus 101. The storage device 202 stores therein a monitoring program, a measured data table 202a and a sorted data table 202b. Any kind of computer-readable recording medium may be adopted as the storage device 202, for example, a non-volatile memory, a flash memory, a hard disk drive (HDD), etc.

The I/F 203 is connected to a network 210, and to external devices included in the network 210. The external devices are, for example, layer 2 switches or layer 3 switches. The I/F 203 manages an interface between the network 210 and the inside of the monitoring apparatus 101, and controls data input from and output to the external devices.

The display device 204 displays a cursor, an icon, a tool box and data such as text, an image, functional information, etc. For example, the display device 204 may be a cathode-ray tube (CRT), a thin-film transistor (TFT) liquid crystal display, a plasma display, etc.

An exemplary data format of the measured data table 202a illustrated in FIG. 2 will be discussed.

FIG. 3 illustrates an exemplary data format of the measured data table 202a. As illustrated in FIG. 3, the measured data table 202a includes a record for each source MAC address. Each record includes a "destination MAC address" entry, a "passed packet count" entry, a "lost packet count" entry and a "quality analysis" entry in relation to a "source MAC address" entry.

The monitoring apparatus 101 captures a packet transmitted through the network and extracts a source MAC address and a destination MAC address, which are stored in the "source MAC address" entry and the "destination MAC address" entry, respectively.

The monitoring apparatus 101 captures packets transmitted through the network and counts the number of captured packets for each source MAC address so as to obtain a packet count of a passed packet group, which is stored in the "passed packet count" entry. The monitoring apparatus 101 captures packets transmitted through the network, and counts the number of lost packets by checking a lack in an ID field of an IP packet so as to obtain a packet count of a lost packet group, which is stored in the "lost packet count" entry. The monitoring apparatus 101 may detect a lost packet by checking a lack in the sequence number of a TCP packet, or in the sequence number of an RTP packet if the network protocol is UDP.

The monitoring apparatus 101 analyzes a communication quality on the basis of the passed packet count and the lost packet count, and stores the analysis result in the "quality analysis" entry. The analysis result indicates whether the packets are degraded in quality. The monitoring apparatus 101 may determine the communication quality as degraded when there exists a lost packet, when the lost packet count is more than a threshold, or when a ratio of the lost packet count to the passed packet count is more than a threshold. In FIG. 3, the analysis result is indicated as "NORMAL" when there exists no quality degradation, and as "DEGRADED" when there exists quality degradation.

At this time, a service such that a loss of a packet significantly affects a customer (for example, voice communication) needs to be given a low threshold. A service such that a loss of a packet insignificantly affects a customer (for example, WEB browsing) may be given a high threshold.

The monitoring apparatus 101 may ask each of the switches for the number (referred to as a transmitted packet count) of the transmitted packets, and a lost packet count on a transmitting side by means of a simple network management protocol (SNMP), so as to obtain a transmitted packet count, a lost packet count on a transmitting side, the number (referred to as a received packet count) of the received packets and a lost packet count on a receiving side of each of the switches. Further, the monitoring apparatus 101 may diagnose quality degradation on the basis of the transmitted packet count, the lost packet count on the transmitting side, the received packet count and the lost packet count on the receiving side obtained above.

The SNMP is a protocol for monitoring and managing a UDP/IP-based network. The SNMP is a protocol to be used for status monitoring or traffic monitoring on a network apparatus or instructing the network apparatus to cut a link.

Although a record is created for each source MAC address in FIG. 3, a record may be created for each destination MAC address or for each combination of a source MAC address and a destination MAC address. Further, a record may be created by using an IP address instead of an MAC address.

Hereafter, it is supposed that the "measured data" includes the source MAC address, the destination MAC address, the passed packet count and the lost packet count.

An exemplary data format of the sorted data table 202b illustrated in FIG. 2 will be discussed.

FIG. 4 illustrates an exemplary data format of the sorted data table 202b. The sorted data table 202b is obtained by sorting measured data stored in the measured data table 202a in accordance with a sort rule corresponding to an allotment rule specified for a switch employing a link aggregation. By sorting measured data stored in the measured data table 202a into segments as many as the links to diagnose quality degradation for each segment, it may be determined how many links are in failure.

It is supposed that the first allotment rule (divide a least significant byte of a source MAC address of a packet by the number of links in the link aggregation, and allot the packet to a link corresponding to the remainder) discussed above is specified for a switch employing a link aggregation.

Thus, a first sort rule corresponding to the first allotment rule is as follows: divide a least significant byte of a source MAC address by the number of links in the link aggregation, and sort the measured data stored in the measured data table 202a into segments as many as the links.

A second sort rule corresponding to the second allotment rule may be adopted instead of the first sort rule. The second sort rule is as follows: divide a least significant byte of a destination MAC address of a packet by the number of links in the link aggregation, and sort the measured data stored in the measured data table 202a into segments as many as the links.

Further, a third sort rule corresponding to the third allotment rule may be adopted. The third sort rule is as follows: divide an exclusive logical sum of the least significant bytes of the source and destination MAC addresses of a packet by the number of links in the link aggregation, and sort the measured data stored in the measured data table 202a into segments as many as the links.

As illustrated in FIG. 4, the sorted data table 202b includes a record for each modulo (n) of respective source MAC addresses. Each record includes a "passed packet count" entry, a "lost packet count" entry and a "quality degradation" entry in relation to a "modulo (n) of source MAC address" entry.

The "modulo (n)" means a remainder after an integer is divided by n. The n is the number of the links in the link aggregation. Specifically, the modulo (n) of source MAC address means a remainder after a least significant byte of the source MAC address is divided by the number of the links in the link aggregation.

The monitoring apparatus 101 sorts passed packet counts stored in the measured data table 202a into segments as many as the links, and stores a sum of the sorted passed packet counts for each segment in the "passed packet count" entry of a corresponding record of the sorted data table 202b. Specifically, the monitoring apparatus 101 divides a least significant byte of a source MAC address stored in each record of the measured data table 202a by the number of the links in the link aggregation to obtain a remainder. The monitoring apparatus 101 sorts the passed packet counts stored in each record of the measured data table 202a into segments in accordance with the remainder. The monitoring apparatus 101 counts a sum of passed packet counts sorted into the same segment corresponding to each remainder, to store the sum in the "passed packet count" entry of a corresponding record of the sorted data table 202b. Thus, the records of the sorted data table 202b correspond to segments. Hereinafter, a record of the sorted data table 202b may also be referred to as a segment in the sorted data table 202b.

The monitoring apparatus 101 sorts lost packet counts stored in the measured data table 202a into segments as many as the links, and stores a sum of the sorted lost packet counts for each segment in the "lost packet count" entry of a corresponding record of the sorted data table 202b. Specifically, the monitoring apparatus 101 divides a least significant byte of a source MAC address stored in each record of the measured data table 202a by the number of the links in the link aggregation to obtain a remainder. The monitoring apparatus 101 sorts the lost packet counts stored in each record of the measured data table 202a into segments in accordance with the remainder. The monitoring apparatus 101 counts a sum of lost packet counts sorted into the same segment corresponding to each remainder, to store the sum in the "lost packet count" entry of a corresponding record of the sorted data table 202b.

The monitoring apparatus 101 diagnoses quality degradation on the basis of the passed packet count and the lost packet count, and stores the diagnosis result in the "quality degradation" entry. The diagnosis result indicates whether the packets are degraded in quality. The monitoring apparatus 101 may determine the quality is degraded when there exists a lost packet, when the lost packet count is more than a threshold, or when a ratio of the lost packet count to the passed packet count is more than a threshold.

In FIG. 4, the quality degradation is indicated as "NORMAL" when there exists no quality degradation, and as "DEGRADED" when there exists quality degradation. A segment having "DEGRADED" in the "quality degradation" entry of a corresponding record of the sorted data table 202b is called a degraded segment. A segment having "NORMAL" in the "quality degradation" entry of a corresponding record of the sorted data table 202b is called a normal segment. The number of degraded segments agrees with the number of failure links.

At this time, a service such that a loss of a packet significantly affects a customer (for example, voice communication) needs to be given a low threshold. A service such that a loss of a packet insignificantly affects a customer (for example, WEB browsing) may be given a high threshold. In FIG. 4, the passed packet count and the lost packet count are stored so as to diagnose quality degradation. However, the monitoring apparatus 101 may store the lost packet count only so as to diagnose quality degradation.

Hereafter, it is supposed that the "sort result" includes the passed packet count, the lost packet count and the quality degradation related to each modulo (n) of respective source MAC addresses. A specific example in which the monitoring apparatus 101 sorts the measured data stored in the measured data table 202a so as to obtain the sorted data table 202b will be discussed with reference to FIG. 5.

Figure 5:
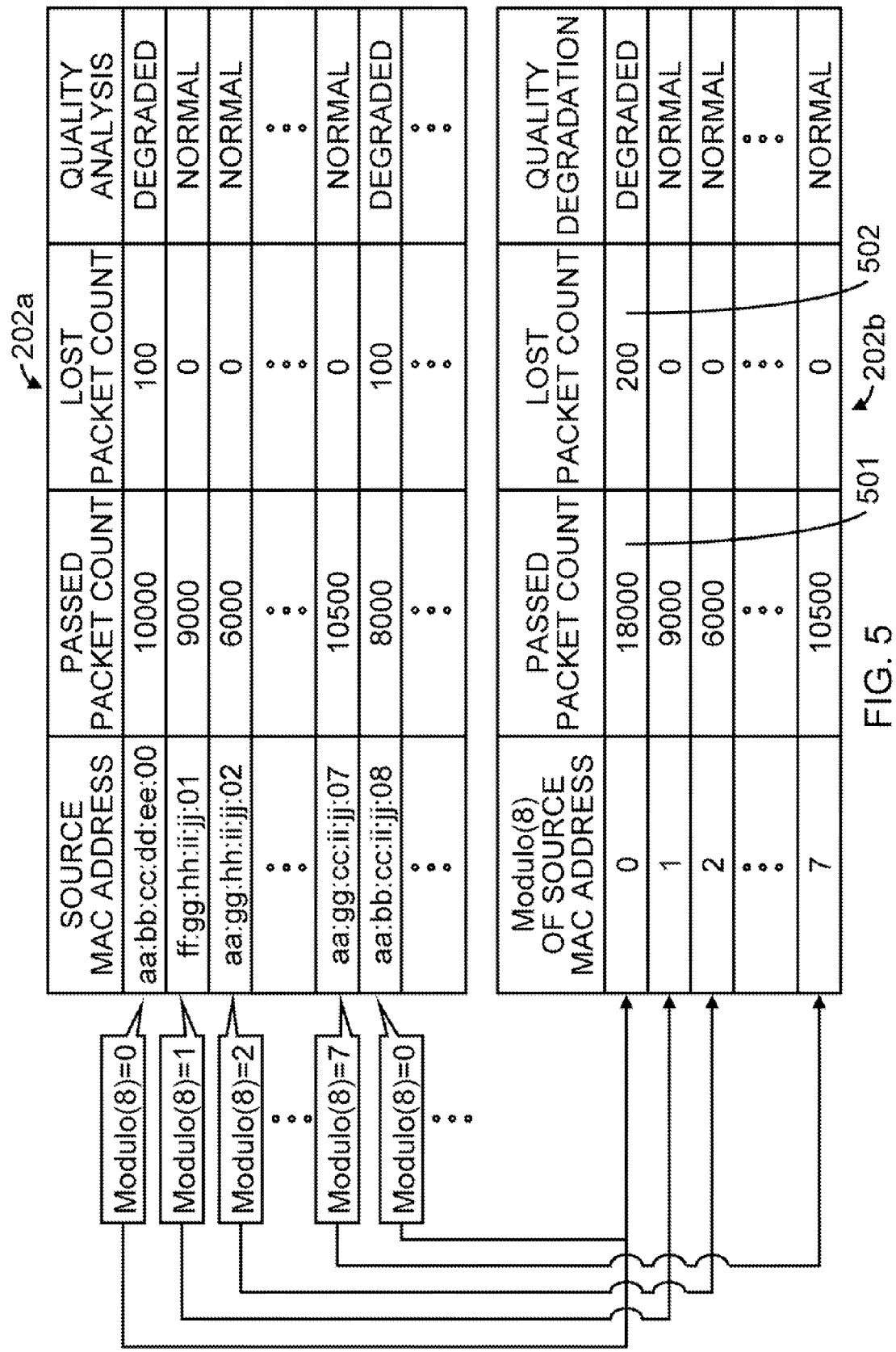
FIG. 5 is a diagram illustrating how to obtain a sorted data table from a measured data table according to an embodiment of the present invention.

FIG. 5 illustrates how to obtain the sorted data table 202b from the measured data table 202a according to the present embodiment. It is supposed that the storage device 202 stores information indicating that the link aggregation is formed by eight links. It is further supposed that the monitoring apparatus 101 has captured packets and obtained the measured data table 202a.

It is supposed that the first sort rule (divide a least significant byte of a source MAC address by the number of links in the link aggregation, and sort the measured data stored in the measured data table 202a into segments as many as the links) discussed above is employed. That is, the "modulo (n)" is a remainder after the least significant byte of the source MAC address is divided by n. In FIG. 5, a destination MAC address in the measured data table 202a is omitted for simplicity because it is unused in accordance with the first sort rule.

The monitoring apparatus 101 divides, at first, the least significant byte of the source MAC address by eight which is the number of the links stored in the storage device 202. The monitoring apparatus 101 sorts the passed packet count and the lost packet count of the respective packets into entries of the sorted data table 202b, corresponding to the respective remainders.

Specifically, for example, a remainder for a packet having a source MAC address "aa:bb:cc:dd:ee:00" is zero, and a remainder for a packet having a source MAC address "aa:bb:cc:ii:jj:08" is also zero. Thus, a sum of the passed packet count for the packet having the source MAC address "aa:bb:cc:dd:ee:00" and the passed packet count for the packet having the source MAC address "aa:bb:cc:ii:jj:08" is stored in an entry 501 of a corresponding record of the sorted data table 202b. Similarly, a sum of the lost packet count for the packet having the source MAC address "aa:bb:cc:dd:ee:00" and the lost packet count for the packet having the source MAC address "aa:bb:cc:ii:jj:08" is stored in an entry 502 of a corresponding record of the sorted data table 202b.

The monitoring apparatus 101 diagnoses whether the packets are degraded in quality on the basis of the passed packet count and the lost packet count stored in the sorted data table 202b, and stores the diagnosis result in the "quality degradation" entry. The monitoring apparatus 101 obtains the sorted data table 202b as discussed above. The monitoring apparatus 101 may store only the lost packet count.

How to obtain information on network topology will be discussed with reference to FIG. 6.

Figure 6:
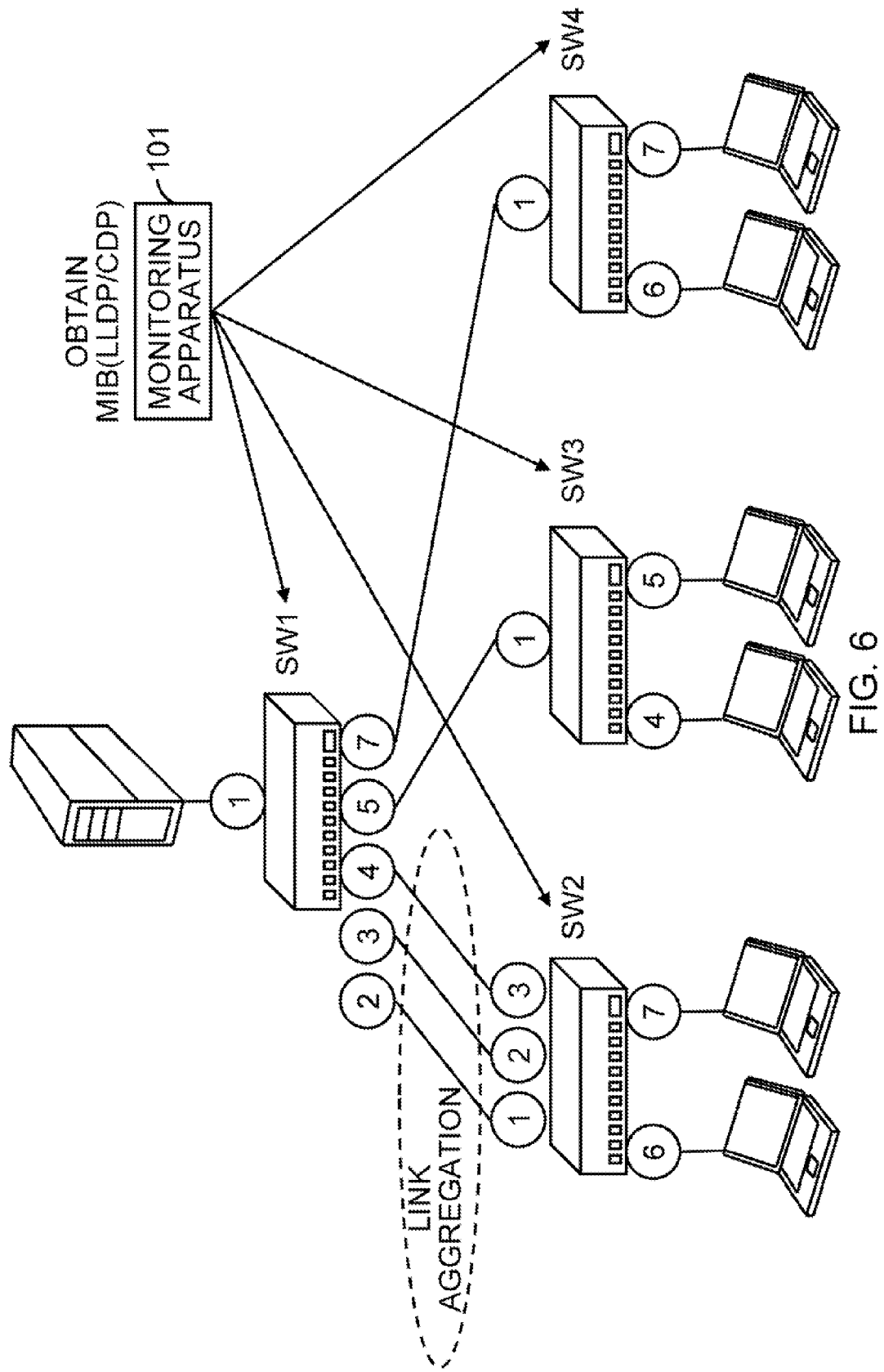
FIG. 6 is a diagram illustrating how to obtain information on network topology according to an embodiment of the present invention.

FIG. 6 illustrates how to obtain information on network topology according to the present embodiment. The monitoring apparatus 101 obtains a management information base (MIB) from each switch by using the SNMP so as to obtain information on network topology. Specifically, the monitoring apparatus 101 collects a link layer discovery protocol (LLDP) or a Cisco discovery protocol (CDP) as an MIB, and collects data as to which port of each switch is connected to which port of which switch so as to obtain topology information.

The monitoring apparatus 101 may thereby obtain the topology information including information on the connections among the respective switches, where a link aggregation is employed and how many links form the link aggregation. The monitoring apparatus 101 stores the information on the connections among the respective switches, where a link aggregation is employed and how many links form the link aggregation in the storage device 202.

In the above discussion, the monitoring apparatus 101 obtains information on network topology by collecting information from each switch. However, the monitoring apparatus 101 may store information on network topology in the storage device 202 in advance.

A functional configuration of the monitoring apparatus 101 will be discussed with reference to FIG. 7.

Figure 7:
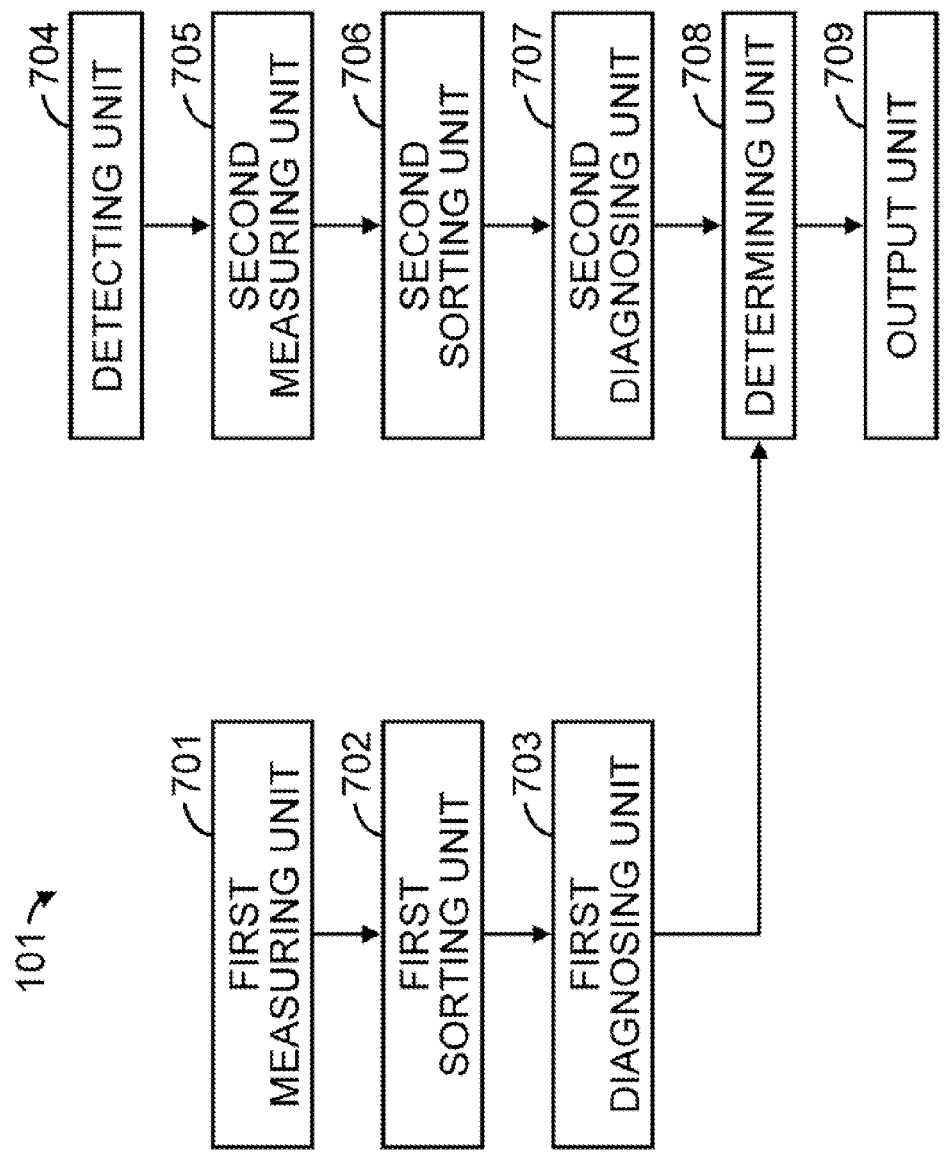
FIG. 7 is a diagram illustrating an exemplary functional configuration of a monitoring apparatus according to an embodiment of the present invention.

FIG. 7 illustrates an exemplary functional configuration of the monitoring apparatus 101 according to the present embodiment. As illustrated in FIG. 7, the monitoring apparatus 101 includes a first measuring unit 701, a first sorting unit 702, a first diagnosing unit 703, a detecting unit 704, a second measuring unit 705, a second sorting unit 706, a second diagnosing unit 707, a determining unit 708 and an output unit 709.

The first measuring unit 701 has a function to measure the number (lost packet count) of lost packets (referred to as a first lost packet group) on a plurality of links which form a link aggregation, for each address of each packet in the first lost packet group. The lost packet count in the first lost packet group mentioned here is the lost packet count obtained by counting detected lost packets in a state where the plural links which form the link aggregation are connected. The address of each packet is a source MAC address or a destination MAC address stored in the measured data table 202a.

The first measuring unit 701 captures a packet transmitted through the network, extracts a source MAC address or a destination MAC address from the captured packet, and stores the extracted address in the measured data table 202a. The first measuring unit 701 captures a packet transmitted through the network, checks a loss in an ID field of an IP packet, the sequence number of a TCP packet or the sequence number of an RTP packet so as to detect a lost packet, counts detected lost packets and stores the lost packet count in the measured data table 202a. The first measuring unit 701 may count captured packets and store the obtained passed packet count in the measured data table 202a.

The first measuring unit 701 may obtain the transmitted packet count and the lost packet count on a transmitting side from each switch by means of the SNMP to store the passed packet count and the lost packet count in the measured data table 202a.

Specifically, for example, the CPU 201 implements the function of the first measuring unit 701 by executing the monitoring program stored in the storage device 202 illustrated in FIG. 2, by means of the I/F 203. The first measuring unit 701 may thereby measure a source MAC address and a destination MAC address of each packet and the lost packet count.

The first sorting unit 702 has a function to sort, on the basis of packets which pass through the plural links forming the link aggregation, the lost packets in the first lost packet group measured by the first measuring unit 701 into segments as many as the links, each segment corresponding to one of the plural links. Specifically, the segments may correspond to the respective remainders obtained after the source MAC address or the destination MAC address is divided by the number of the links in the link aggregation.

The first sorting unit 702 sorts measured data stored in the measured data table 202a in accordance with a sort rule corresponding to an allotment rule specified for the switch employing the link aggregation, so as to obtain the sorted data table 202b. When the first sorting unit 702 knows the sort rule corresponding to the allotment rule specified for the switch employing the link aggregation, the first sorting unit 702 employs that known sort rule.

When the first sorting unit 702 does not know the sort rule corresponding to the allotment rule specified for the switch employing the link aggregation, the first sorting unit 702 employs the first sort rule. If a sort result according to the first sort rule is inadequate, the first sorting unit 702 may sort the measured data again in accordance with the second sort rule. If a sort result according to the second sort rule is still inadequate, the first sorting unit 702 may employ the third sort rule.

One example of an inadequate sort result is such that all the values stored in the "quality degradation" entry of the sorted data table 202b are "DEGRADED". In general, an allotment rule is specified for a switch in such a way that packets are evenly allotted to the respective links. Thus, if a sort result is biased, for example, if the remainder obtained after the least significant byte of the source MAC address is divided by the number of the links in the link aggregation is always zero, the first sorting unit 702 may determine that the sort result is inadequate.

The first sorting unit 702 may thereby sort measured data stored in the measured data table 202a into segments as many as the links and diagnoses quality degradation for each segment, so as to determine the number of the failure links. The first sorting unit 702 may try the first to third sort rules in order and determine for each sort rule whether the sort result is adequate, so as to identify the sort rule corresponding to the allotment rule specified for the switch employing the link aggregation.

Specifically, for example, the CPU 201 implements the function of the first sorting unit 702 by executing the monitoring program stored in the storage device 202 illustrated in FIG. 2. The first sorting unit 702 may thereby sort measured data of each packet which passes through the plurality of links which form the link aggregation into segments as many as the links. Although the CPU 201 sorts the measured data into segments as many as the links, the CPU 201 may not determine to which link in the link aggregation each of the segments as many as the links corresponds.

The first diagnosing unit 703 has a function to diagnose, for each segment, quality degradation on the basis of the lost packet count corresponding to one of the segments into which the first sorting unit 702 sorts the measured data. The term "quality degradation" means, for example, a fact that there exists a lost packet, that the lost packet count is more than a threshold, or that a ratio of the lost packet count to the passed packet count is more than a threshold.

Specifically, the first diagnosing unit 703 may determine a segment to be degraded in quality, for example, when there exists a lost packet. The first diagnosing unit 703 may determine a segment to be degraded in quality when the lost packet count is more than a threshold, or when a ratio of the lost packet count to the passed packet count is more than a threshold. The first diagnosing unit 703 stores a diagnosis result in the "quality degradation" entry of the sorted data table 202b.

Specifically, for example, the CPU 201 implements the function of the first diagnosing unit 703 by executing the monitoring program stored in the storage device 202 illustrated in FIG. 2. The first diagnosing unit 703 may thereby diagnose quality degradation for each of the segments as many as the links, so as to determine whether a failure has occurred in the link aggregation or not and to determine the number of failure links. The first diagnosing unit 703 may diagnose quality degradation on the basis of the transmitted packet count and the lost packet count on the transmitting side, or on the basis of the received packet count and the lost packet count on the receiving side.

The detecting unit 704 has a function to detect one of a plurality of links having been cut. The detecting unit 704 instructs a switch to cut a link by means of the SNMP, and detects a link having been cut upon receiving a response from the switch. The detecting unit 704 may ask the switch about link connection conditions by means of the SNMP so as to detect the link having been cut.

Specifically, for example, the CPU 201 implements the function of the detecting unit 704 by executing the monitoring program stored in the storage device 202 illustrated in FIG. 2, by means of the I/F 203. The detecting unit 704 may thereby automatically detect a link having been cut.

The second measuring unit 705 has a function to measure, upon the detecting unit 704 detecting a link having been cut, the number (lost packet count) of lost packets (referred to as a second lost packet group) on remaining links excluding the one that has been cut, for each address of each packet in the second lost packet group. The lost packet count in the second lost packet group mentioned here is the lost packet count by counting detected lost packets in a state where the remaining links in the link aggregation excluding the one that has been cut are connected. The address of each packet is a source MAC address or a destination MAC address stored in the measured data table 202a.

The second measuring unit 705 captures a packet transmitted through the network, extracts a source MAC address or a destination MAC address from the captured packet, and stores the extracted address in the measured data table 202a. The second measuring unit 705 captures a packet transmitted through the network, checks a loss in an ID field of an IP packet, the sequence number of a TCP packet or the sequence number of an RTP packet so as to detect a lost packet, counts detected lost packets and stores the lost packet count in the measured data table 202a. The second measuring unit 705 may count captured packets and store the obtained passed packet count in the measured data table 202a.

Specifically, for example, the CPU 201 implements the function of the second measuring unit 705 by executing the monitoring program stored in the storage device 202 illustrated in FIG. 2, by means of the I/F 203. The second measuring unit 705 may thereby measure a source MAC address and a destination MAC address of each packet and the lost packet count after the link cut.

The second sorting unit 706 has a function to sort, on the basis of packets which pass through the remaining links, the lost packets in the second lost packet group measured by the second measuring unit 705 into segments as many as the links, each segment corresponding to one of the remaining links. Specifically, the segments as many as the links which each represent one of the remaining links are segments may correspond to the respective remainders obtained after the source MAC address or the destination MAC address is divided by the number of the remaining links in the link aggregation excluding the link having been cut.

The second sorting unit 706 sorts measured data stored in the measured data table 202a in accordance with a sort rule corresponding to an allotment rule specified for the switch employing the link aggregation, so as to obtain the sorted data table 202b. When the second sorting unit 706 knows the sort rule corresponding to the allotment rule specified for the switch employing the link aggregation, the second sorting unit 706 employs that known sort rule.

When the second sorting unit 706 does not know the sort rule corresponding to the allotment rule specified for the switch employing the link aggregation, the second sorting unit 706 employs the first sort rule. If a sort result according to the first sort rule is inadequate, the second sorting unit 706 may sort the measured data again in accordance with the second sort rule. If a sort result according to the second sort rule is still inadequate, the second sorting unit 706 may employ the third sort rule.

One example of an inadequate sort result is such that all the values stored in the "quality degradation" entry of the sorted data table 202b are "DEGRADED". In general, an allotment rule is specified for a switch in such a way that packets are evenly allotted to the respective links. Thus, if a sort result is biased, for example, if the remainder obtained after the least significant byte of the source MAC address is divided by the number of the remaining links is always zero, the second sorting unit 706 may determine that the sort result is inadequate.

The second sorting unit 706 may thereby sort measured data stored in the measured data table 202a into segments as many as the links and diagnoses quality degradation for each segment, so as to determine the number of the failure links. The second sorting unit 706 may try the first to third sort rules in order and determine for each sort rule whether the sort result is adequate, so as to identify the sort rule corresponding to the allotment rule specified for the switch employing the link aggregation.

Specifically, for example, the CPU 201 implements the function the second sorting unit 706 by executing the monitoring program stored in the storage device 202 illustrated in FIG. 2. The second sorting unit 706 may thereby sort measured data of each packet which passes through the remaining links excluding the link having been cut into segments as many as the remaining links. Although the CPU 201 sorts the measured data into segments as many as the remaining links, the CPU 201 may not determine to which remaining link each of the segments as many as the remaining links corresponds.

The second diagnosing unit 707 has a function to diagnose, for each segment, quality degradation on the basis of the lost packet count corresponding to one of the segments into which the second sorting unit 706 sorts the measured data. The term "quality degradation" means, for example, a fact that there exists a lost packet, that the lost packet count is more than a threshold, or that a ratio of the lost packet count to the passed packet count is more than a threshold.

Specifically, the second diagnosing unit 707 may determine a segment to be degraded in quality, for example, when there exists a lost packet. The second diagnosing unit 707 may determine a segment to be degraded in quality when the lost packet count is more than a threshold, or when a ratio of the lost packet count to the passed packet count is more than a threshold. The second diagnosing unit 707 stores a diagnosis result in the "quality degradation" entry of the sorted data table 202b.

Specifically, for example, the CPU 201 implements the function of the second diagnosing unit 707 by executing the monitoring program stored in the storage device 202 illustrated in FIG. 2. The second diagnosing unit 707 may thereby diagnose quality degradation for each of the segments as many as the remaining links in the link aggregation excluding the link having been cut, so as to determine whether a failure has occurred in the link aggregation or not and to determine the number of failure links.

The determining unit 708 has a function to determine whether the link having been cut is in failure or not on the basis of the number of the segments determined by the first diagnosing unit 703 to be degraded in quality and the number of the segments determined by the second diagnosing unit 707 to be degraded in quality.

Specifically, when the number of the segments determined to be degraded in quality by the first diagnosing unit 703 agrees with the number of the segments determined to be degraded in quality by the second diagnosing unit 707, the determining unit 708 determines that the remaining links include a failure link since the number of failure links does not change. Meanwhile, when the number of the segments determined to be degraded in quality by the second diagnosing unit 707 is smaller than the number of the segments determined to be degraded in quality by the first diagnosing unit 703, the determining unit 708 determines that the link having been cut is in failure since the number of failure links has decreased. Even when more than one links are in failure, the determining unit 708 may thereby determine all the failure links.

In a network being operated, a failure occurs in only one link more often than simultaneously in a plurality of links. Thus, the determining unit 708 may identify a failure link under the assumption that only one link is in failure. In such a case, the first measuring unit 701 through the first diagnosing unit 703 may skip their processes and the assumption that only one link is in failure may be stored in the storage device 202.

When the second diagnosing unit 707 has determined that a segment is degraded in quality, the determining unit 708 determines that the remaining links include a failure link since the number of failure links does not change after a link is cut. Thus, the detecting unit 704 cuts one of the remaining links so as to identify the one in failure of the remaining links. The detecting unit 704 cuts links one by one until identifying the failure link in this way.

When the second diagnosing unit 707 has determined that no segment is degraded in quality, the determining unit 708 determines that the link having been cut is in failure since the number of failure links has decreased from one to zero after the link cut. Upon identifying the failure link, the monitoring apparatus 101 may terminate the process for identifying a failure link.

If only one link is in failure, the determining unit 708 may thereby identify the failure link even if the first measuring unit 701 through the first diagnosing unit 703 skip their processes. Further, upon identifying the failure link, the monitoring apparatus 101 may terminate the process for identifying a failure link. Thus, the monitoring apparatus 101 may accelerate the process for identifying a failure link.

The determining unit 708 has a function, upon the first diagnosing unit 703 determining all the segments to be degraded in quality, to determine the plural links forming the link aggregation do not include a failure link.

Specifically, if a packet passes through a failure link before passing through a link aggregation as discussed later with reference to FIGS. 11A and 11B, all packets cause quality degradation before passing through the link aggregation. Thus, regardless of which link in the link aggregation a packet passes through, the packet causes quality degradation, and the "quality degradation" entries of all the records of the sorted data table 202b stores "DEGRADED". The "quality degradation" entry stores "NORMAL" when there exists no quality degradation, and "DEGRADED" when there exists quality degradation.

When the first diagnosing unit 703 determines all the segments to be degraded in quality, the determining unit 708 determines that a link other than the link aggregation is in failure. The determining unit 708 may thereby determine that the link aggregation includes no failure link and that a link other than the link aggregation is in failure. The determining unit 708 may determine that all the links in the link aggregation are in failure.

The determining unit 708 has a function, upon the first diagnosing unit 703 determining some segments to be normal in quality and other segments to be degraded in quality, to determine that the plural links forming the link aggregation include a failure link.

Specifically, when a link in the link aggregation is in failure, as discussed later with reference to FIGS. 10A and 10B, only a packet having passed through the failure link causes quality degradation. Thus, the "quality degradation" entry of some records of the sorted data table 202b stores "NORMAL" and the "quality degradation" entry of other records of the sorted data table 202b stores "DEGRADED". Thus, when the sorted data table 202b after the diagnosis by the first diagnosing unit 703 includes both "NORMAL" and "DEGRADED", the determining unit 708 determines that the link aggregation includes a failure link. The determining unit 708 may thereby start a process for identifying which link in the link aggregation is in failure. When a failure occurs in the network, at least one segment is determined to be degraded in quality.

Specifically, for example, the CPU 201 implements the function of the determining unit 708 by executing the monitoring program stored in the storage device 202 illustrated in FIG. 2.

The output unit 709 has a function to output a determination result determined by the determining unit 708. Specifically, the output unit 709 reads a determination result stored in the storage device 202 and sends the determination result to the display device 204. The display device 204 thereby displays the determination result.

The output unit 709 may print the determination result out or transmit the determination result to another device communicable with the monitoring apparatus 101. Specifically, for example, the CPU 201 implements the function of the output unit 709 by executing the monitoring program stored in the storage device 202 illustrated in FIG. 2. The output unit 709 may thereby output which link is identified to be in failure.

How to identify a failure link will be discussed with reference to FIGS. 8 and 9.

Figure 8:
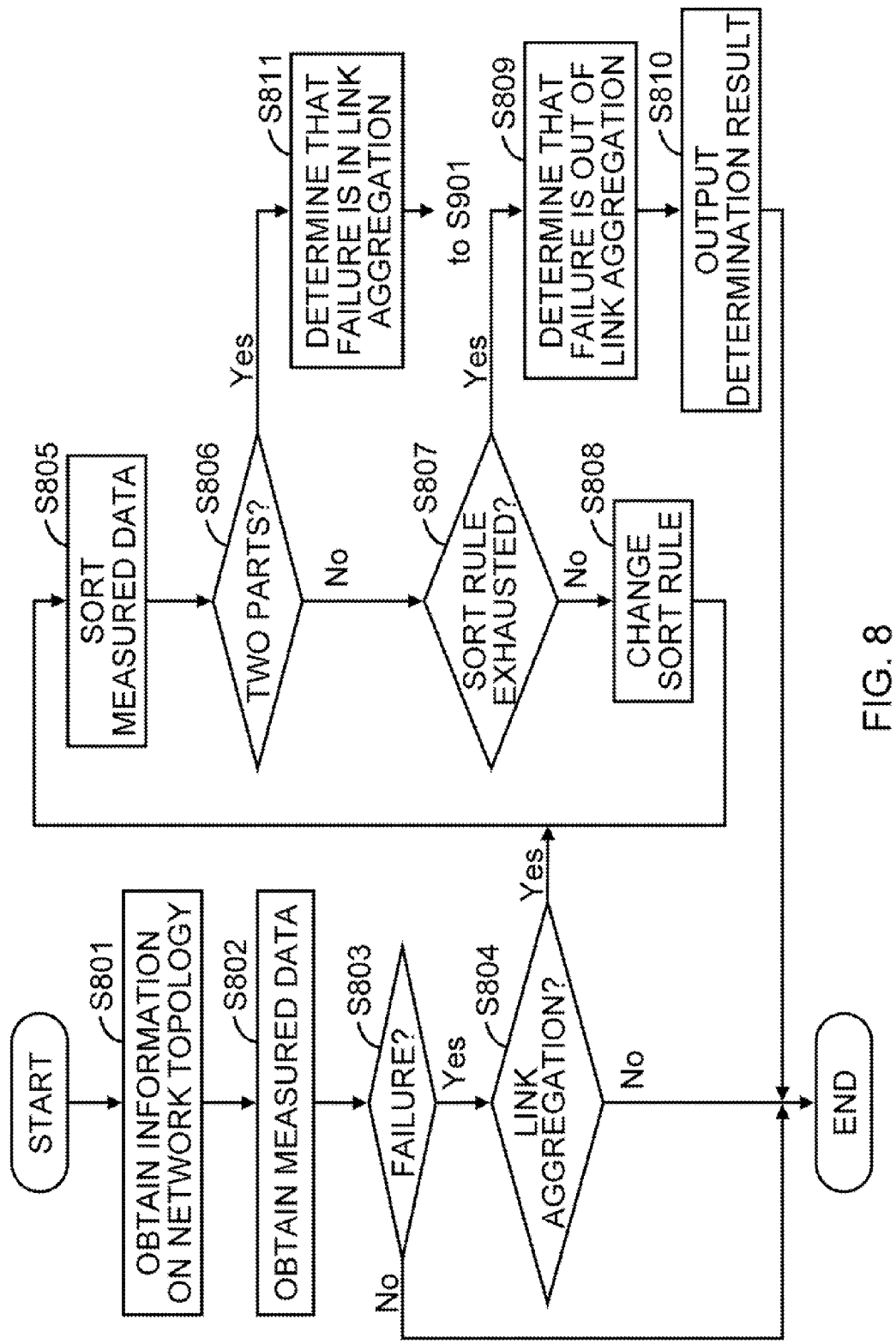
FIGS. 8 and 9 are diagrams illustrating an exemplary operation flow of a process for identifying a failure link performed by a monitoring apparatus according to an embodiment of the present invention.
Figure 9:
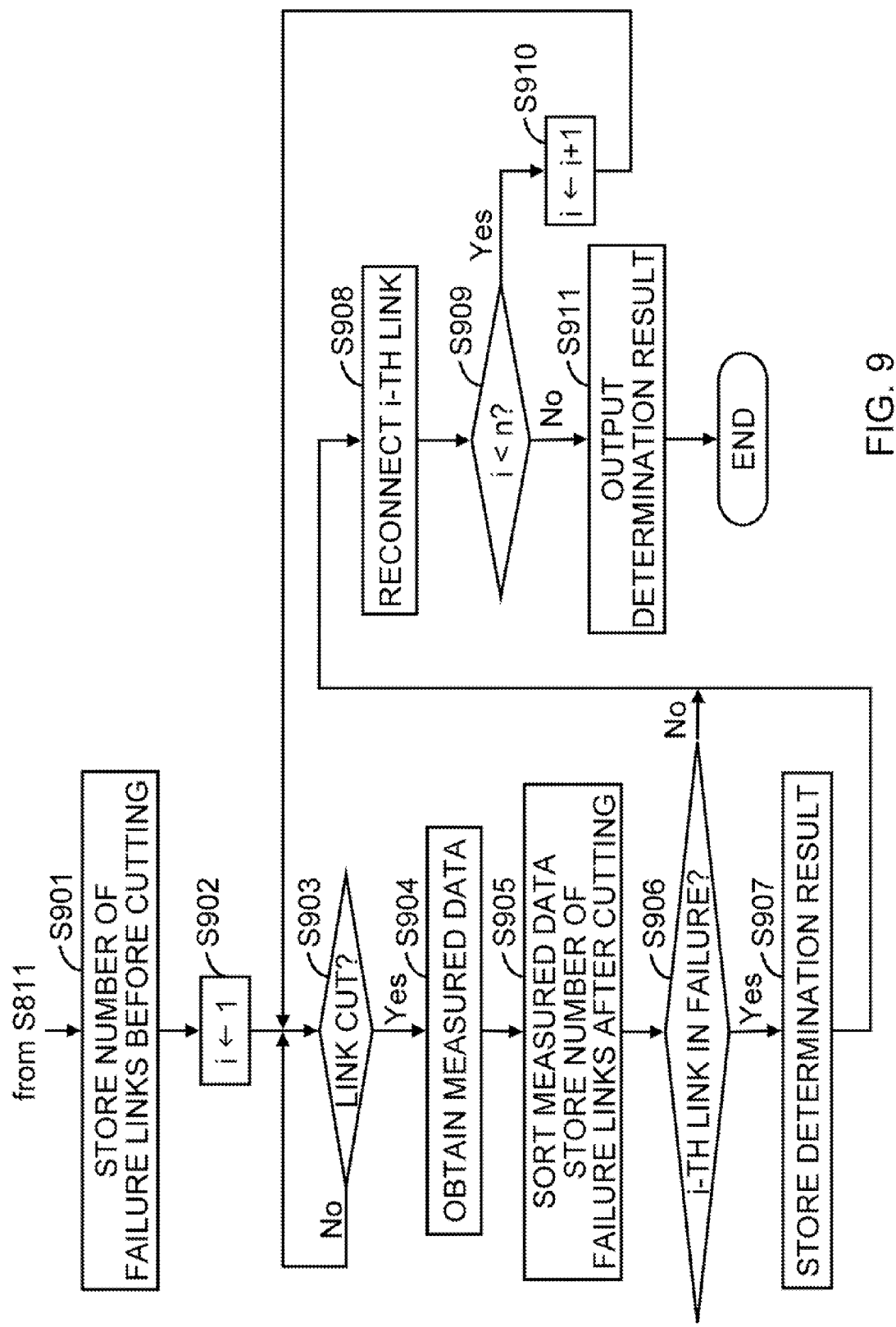

FIGS. 8 and 9 illustrate an exemplary operation flow of a process for identifying a failure link performed by the monitoring apparatus 101 according to the present embodiment. It is supposed that the link aggregation is formed by n links and the letter "i" represents the link number.

In S801, the CPU 201 obtains information on network topology and stores the information on network topology in the storage device 202.

In S802, the CPU 201 obtains measured data and stores the measured data in the measured data table 202a.

In S803, the CPU 201 determines whether a failure has occurred in the network. Specifically, the CPU 201 diagnoses whether quality degradation has occurred or not on the basis of the measured data. When quality degradation has occurred, the CPU 201 determines that a failure has occurred in the network. When no failure has occurred in the network ("No" in S803), the CPU 201 determines that the network is normal and terminates the process. When a failure has occurred in the network ("Yes" in S803), the CPU 201 advances the process to S804.

In S804, the CPU 201 determines whether the network includes a link aggregation. When the network includes no link aggregation ("No" in S804), the CPU 201 terminates the process for identifying a failure link. A failure link may be identified in a network including no link aggregation by means of conventional techniques.

When the network includes a link aggregation ("Yes" in S804), the CPU 201 advances the process to S805 in order that the CPU 201 may determine whether the failure link is in the link aggregation or not.

In S805, the CPU 201 sorts the measured data stored in the measured data table 202a into segments as many as the links in the link aggregation in accordance with the specified sort rule. The CPU 201 stores the sort result in the sorted data table 202b.

In S806, the CPU 201 determines whether the sorted data table 202b consists of two parts, that is, "NORMAL" segments and "DEGRADED" segments.

In S811, when the sorted data table 202b consists of two parts ("Yes" in S806), the CPU 201 determines that one of the links in the link aggregation is in failure, and stores the determination result in the storage device 202. Then, the CPU 201 advances the process to S901 in FIG. 9 so as to identify a link in failure. When the sorted data table 202b does not consist of two parts ("No" in S806), the CPU 201 advances the process to S807.

The case where the sorted data table 202b does not consist of two parts is a case where all the records of the sorted data table 202b have "DEGRADED" in the "quality degradation" entry. The case where the sorted data table 202b consists of two parts is a case where some records of the sorted data table 202b have "NORMAL" in the "quality degradation" entry and other records of the sorted data table 202b have "DEGRADED" in the "quality degradation" entry.

In S807, the CPU 201 determines whether all the sort rules have been tried.

In S808, when some sort rule has not been tried yet ("No" in S807), the CPU 201 changes the sort rule to the untried sort rule. Thereafter, the CPU 201 returns the process to S805 so as to sort the measured data again.

In S809, when all the sort rules have been tried but the CPU 201 may not sort the measured data into normal segments and degraded segments by means of any of the sort rules ("Yes" in S807), the CPU 201 determines that a link other than the link aggregation is in failure. The CPU 201 stores the determination result in the storage device 202.

In S810, the CPU 201 outputs the determination result stored in the storage device 202 and terminates the process. A failure link outside the link aggregation may be identified by means of conventional techniques.

When a failure occurs in the link aggregation, the CPU 201 may identify, owing to the determinations at S806 and S807, a sort rule corresponding to an allotment rule specified for the switch employing the link aggregation. When a failure occurs outside the link aggregation, the CPU 201 may determine that a link other than the link aggregation is in failure.

Specifically, the CPU 201 sorts the measured data in accordance with the first sort rule at first. If the CPU 201 has not obtained both of normal segments and degraded segments, the CPU 201 determines that the sort result is inadequate. Then, the CPU 201 determines that the first sort rule does not correspond to the allotment rule specified for the switch employing the link aggregation, and then sorts the measured data in accordance with the second sort rule. If the CPU 201 has not obtained both of normal segments and degraded segments at this time, the CPU 201 determines that the sort result is inadequate.

Then, the CPU 201 determines that the second sort rule does not correspond to the allotment rule specified for the switch employing the link aggregation, and then sorts the measured data in accordance with the third sort rule. If all the sort rules have been tried but the CPU 201 has not obtained both of normal segments and degraded segments, the CPU 201 determines that the inadequate sort result is not caused by the sort rules. Since the CPU 201 has not obtained both of normal segments and degraded segments, the CPU 201 may determine that a link other than the link aggregation is in failure.

Meanwhile, if the sort result according to one of the sort rules is adequate, the CPU 201 may identify the relevant sort rule as corresponding to the allotment rule specified for the switch employing the link aggregation. In general, an allotment rule is specified for a switch in such a way that packets are evenly allotted to the respective links. Thus, if a sort result is biased, for example, if each remainder obtained after the least significant byte of the source MAC address is divided by the number of the links in the link aggregation is zero, the CPU 201 may determine that the sort result is inadequate.

In S901, the CPU 201 stores in the storage device 202, the number of degraded segments in the sorted data table 202b as the number of failure links before a link is cut.

In S902, the CPU 201 sets the link number "i" to 1.

In S903, the CPU 201 determines whether the i-th link has been cut. So as to determine that the i-th link has been cut, the CPU 201 may, for example, instruct the switch employing the link aggregation to cut the i-th link and either wait for the switch to notify that the i-th link has been cut or determine the i-th link has been cut after a certain period of time. The CPU 201 gives an instruction to cut the link by means of the SNMP.

When the i-th link has not been cut ("No" in S903), the CPU 201 returns the process to S903.

In S904, when the i-th link has been cut ("Yes" in S903), the CPU 201 obtains measured data after the link cut.

In S905, the CPU 201 sorts the obtained measured data after the link cut into segments as many as the remaining links in the link aggregation excluding the link having been cut in accordance with the same sort rule as the one employed when the CPU 201 determined that the sorted data table 202b consists of two parts at the S806 in FIG. 8, and stores the sort result in the sorted data table 202b. The CPU 201 stores in the storage device 202, the number of degraded segments in the sorted data table 202b as the number of the failure links after the link cut.

In S906, the CPU 201 determines whether the i-th link is in failure. Specifically, if the number of failure links after the link cut stored in the storage device 202 is smaller than the number of failure links before the link is cut stored in the storage device 202, the CPU 201 determines that the i-th link is in failure. If the number of failure links before the link is cut stored in the storage device 202 agrees with the number of failure links after the link cut stored in the storage device 202, the CPU 201 determines that the i-th link is not in failure.

When the i-th link is not in failure ("No" in S906), the CPU 201 advances the process to S908.

In S907, when the i-th link is in failure ("Yes" in S906), the CPU 201 stores the determination result in the storage device 202, and advances the process to S908.

In S908, the CPU 201 reconnects the i-th link, so as to recover a bandwidth reduced by cutting the link. The CPU 201 gives the instruction to reconnect the link by means of the SNMP previously mentioned.

In S909, the CPU 201 determines whether the link number "i" is smaller than the number of the links.

In S910, when the link number "i" is smaller than the number of the links ("Yes" in S909), the CPU 201 increments the link number "i" as a link is left that is not yet determined to be in failure or not. The CPU 201 returns the process to S903 and to check another link.

In S911, when the link number "i" is equal to or more than the number of the links ("No" in S909), the CPU 201 outputs the determination result to the display device 204 as having checked all the links in the link aggregation, and terminates the process for identifying a failure link.

The monitoring apparatus 101 may identify a failure link as discussed above. Further, the monitoring apparatus 101 may automatically perform the processes from obtaining information on network topology to identifying a failure link.

In order to perform the process for identifying a failure link under the assumption that a failure has occurred in the link aggregation, the monitoring apparatus 101 may start the process for identifying a failure link from the S901 in FIG. 9. The monitoring apparatus 101 may thereby accelerate the process for identifying a failure link.

In order to perform the process for identifying a failure link under the assumption that a failure has occurred in the link aggregation and that only one link is in failure, the monitoring apparatus 101 may start the process for identifying a failure link from the S902 in FIG. 9. In this case, at the S906, the CPU 201 determines whether the link having been cut is in failure depending upon if a failure link remains after the link cut, instead of using the number of failure links before the link is cut.

Specifically, if a failure link remains after the link cut, the CPU 201 determines that the link having been cut is not in failure. If a failure link does not remain after the link cut, the CPU 201 determines that the link having been cut is in failure. Upon determining that the link having been cut is in failure, the CPU 201 may output the determination result to the display device 204 and terminate the process for identifying a failure link. The monitoring apparatus 101 may thereby accelerate the process for identifying a failure link.

A specific example of the process in which the monitoring apparatus 101 determines whether a failure has occurred in the link aggregation will be discussed with reference to FIGS. 10A, 10B, 11A, and 11B. In the following, it is supposed for simplicity that the sort rule is the first sort rule previously discussed (to divide a least significant byte of a source MAC address by the number of links in the link aggregation, and to sort measured data stored in the measured data table 202a into segments as many as the links).

Figure 10A:
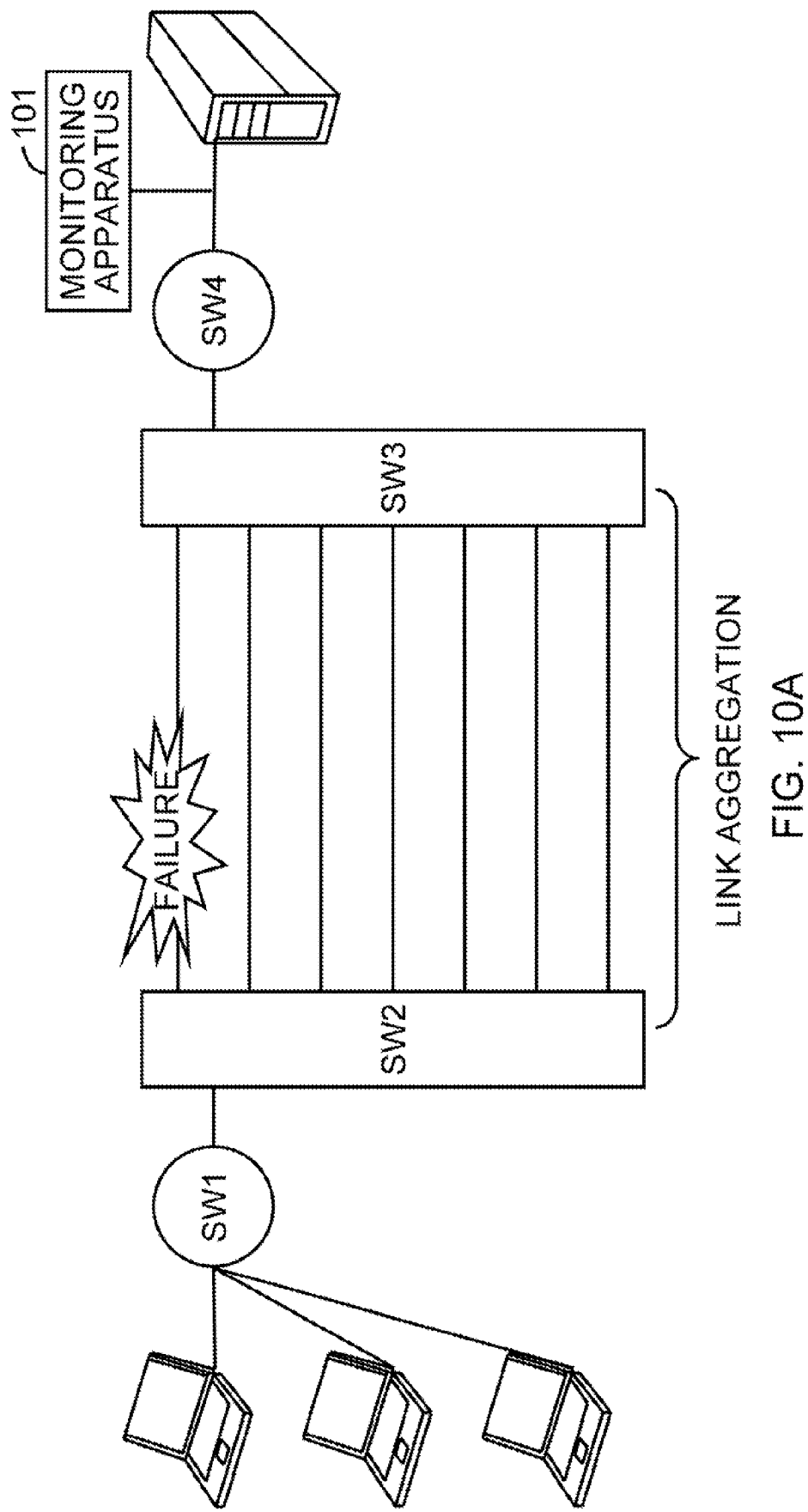

FIGS. 10A and 10B illustrate an exemplary process in which the monitoring apparatus 101 determines whether a failure has occurred in the link aggregation according to the present embodiment.

The monitoring apparatus 101 sorts measured data stored in the measured data table 202a so as to obtain the sorted data table 202b. If a failure has occurred in the link aggregation as illustrated in FIG. 10A, a packet which has passed through a failure link is degraded in quality, and a packet which has passed through a link other than a failure link is not degraded in quality. Thus, as illustrated in FIG. 10B, the sorted data table 202b consists of two parts, that is, normal segments and degraded segments.

FIGS. 11A and 11B illustrate another exemplary process in which the monitoring apparatus 101 determines whether a failure has occurred in the link aggregation according to the present embodiment.

If a failure has occurred outside the link aggregation as illustrated in FIG. 11A, each packet passes through the failure link before passing through the link aggregation, resulting in being degraded in quality. Thus, as illustrated in FIG. 11B, all the segments in the sorted data table 202b are degraded segments.

Thus, the monitoring apparatus 101 may determine whether a failure has occurred in the link aggregation with reference to the "quality degradation" entry of the records of the sorted data table 202b. Specifically, if the sorted data table 202b consists of two parts, that is, normal segments and degraded segments, the monitoring apparatus 101 may determine that a failure has occurred in the link aggregation. The number of the degraded segments in the sorted data table 202b agrees with the practical number of the failure links. The monitoring apparatus 101 stores in the storage device 202, the number of the degraded segments as the number of the failure links.

If all the segments in the sorted data table 202b are degraded segments, the monitoring apparatus 101 may determine that a failure has occurred outside the link aggregation. Alternatively, the monitoring apparatus 101 may determine in this case that all the links in the link aggregation are in failure.

A specific example of the process in which the monitoring apparatus 101 identifies which link in the link aggregation is in failure will be discussed with reference to FIGS. 12A, 12B, 13A, and 13B. In the following, it is supposed for simplicity that the sort rule is the first sort rule previously discussed (to divide a least significant byte of a source MAC address by the number of links in the link aggregation, and to sort measured data stored in the measured data table 202a into segments as many as the links).

Figure 12A:
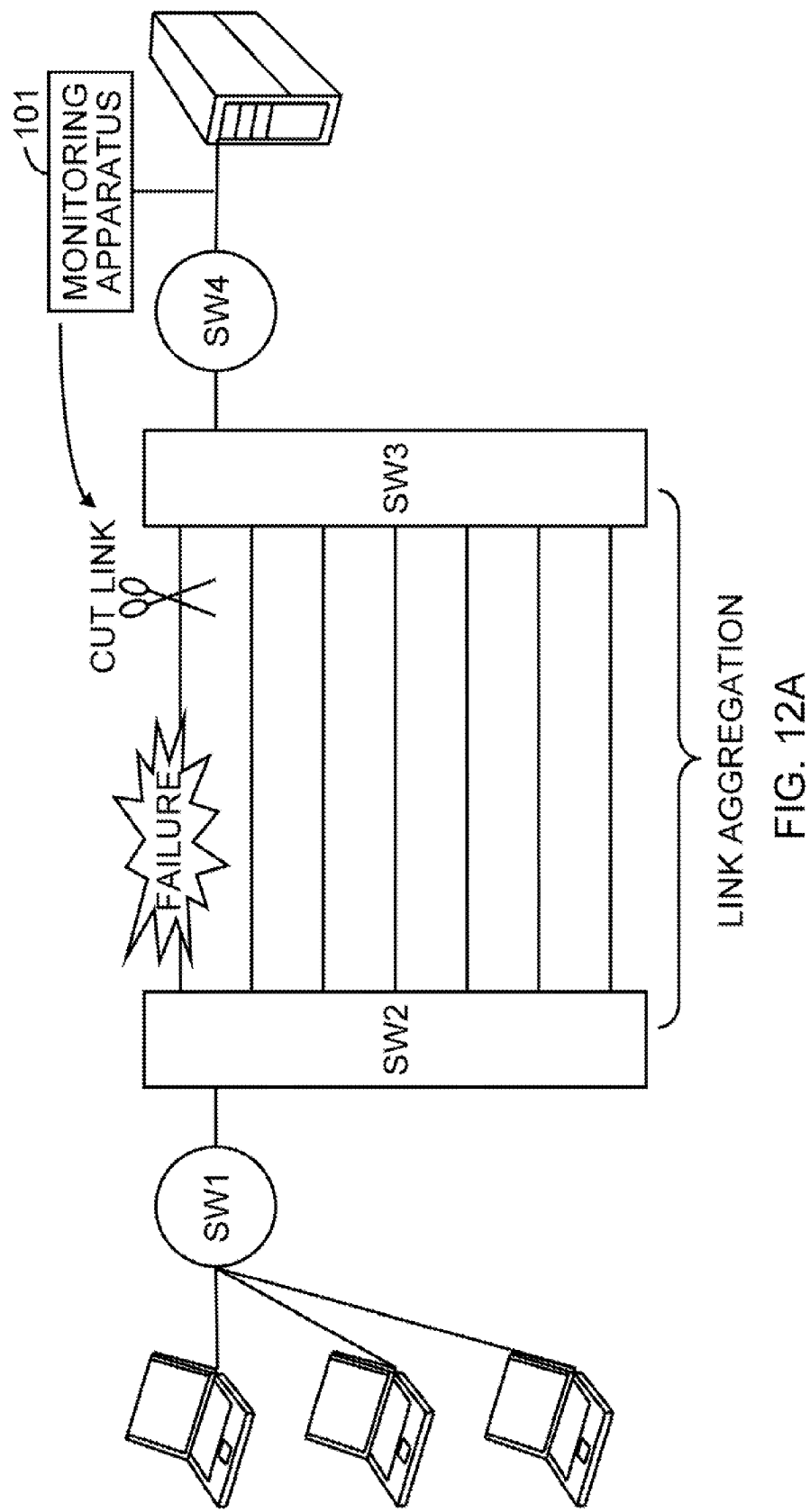
FIGS. 12A and 12B are diagrams illustrating an exemplary process in which a monitoring apparatus identifies which link in the link aggregation is in failure according to an embodiment of the present invention.
Figure 12B:
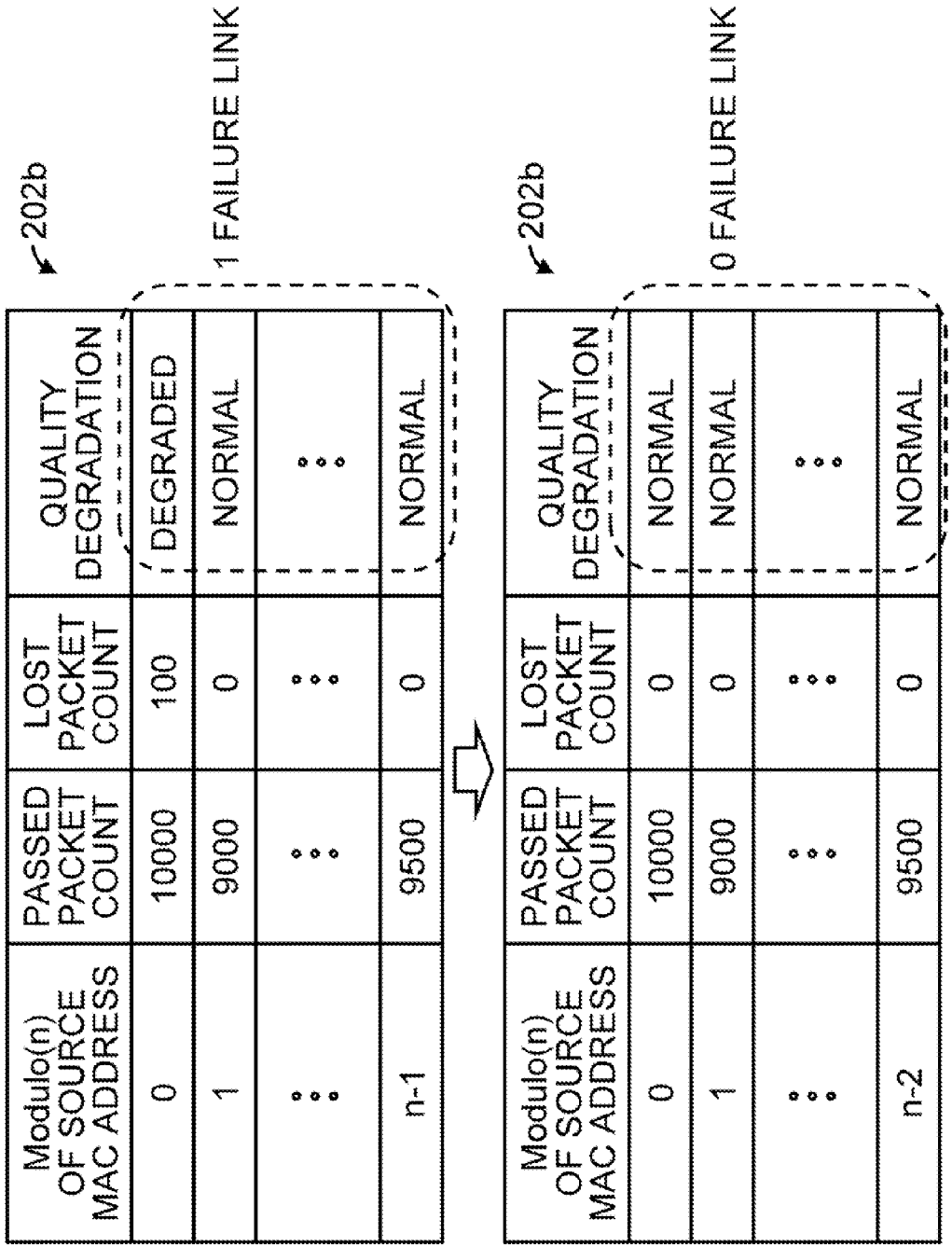

FIGS. 12A and 12B illustrate an exemplary process in which the monitoring apparatus 101 identifies which link in the link aggregation is in failure according to the present embodiment. The monitoring apparatus 101 instructs the switch SW2 to cut a link. Upon determining that the link has been cut, the monitoring apparatus 101 sorts measured data stored in the measured data table 202a so as to obtain the sorted data table 202b.

If the link having been cut is in failure as illustrated in FIG. 12A, the remaining links include no failure link and each packet passes through a normal link so as not to be degraded in quality. Thus, as illustrated in FIG. 12B, no record of the sorted data table 202b stores "DEGRADED" in the "quality degradation" entry after the link cut. That is, the number of failure links after the link cut is determined to be zero.

Since the number of failure links before the link is cut stored in the storage device 202 is one in this case, the number of failure links decreases after the link cut. Thus, the monitoring apparatus 101 may determine that the link having been cut is in failure.

Figure 13A:
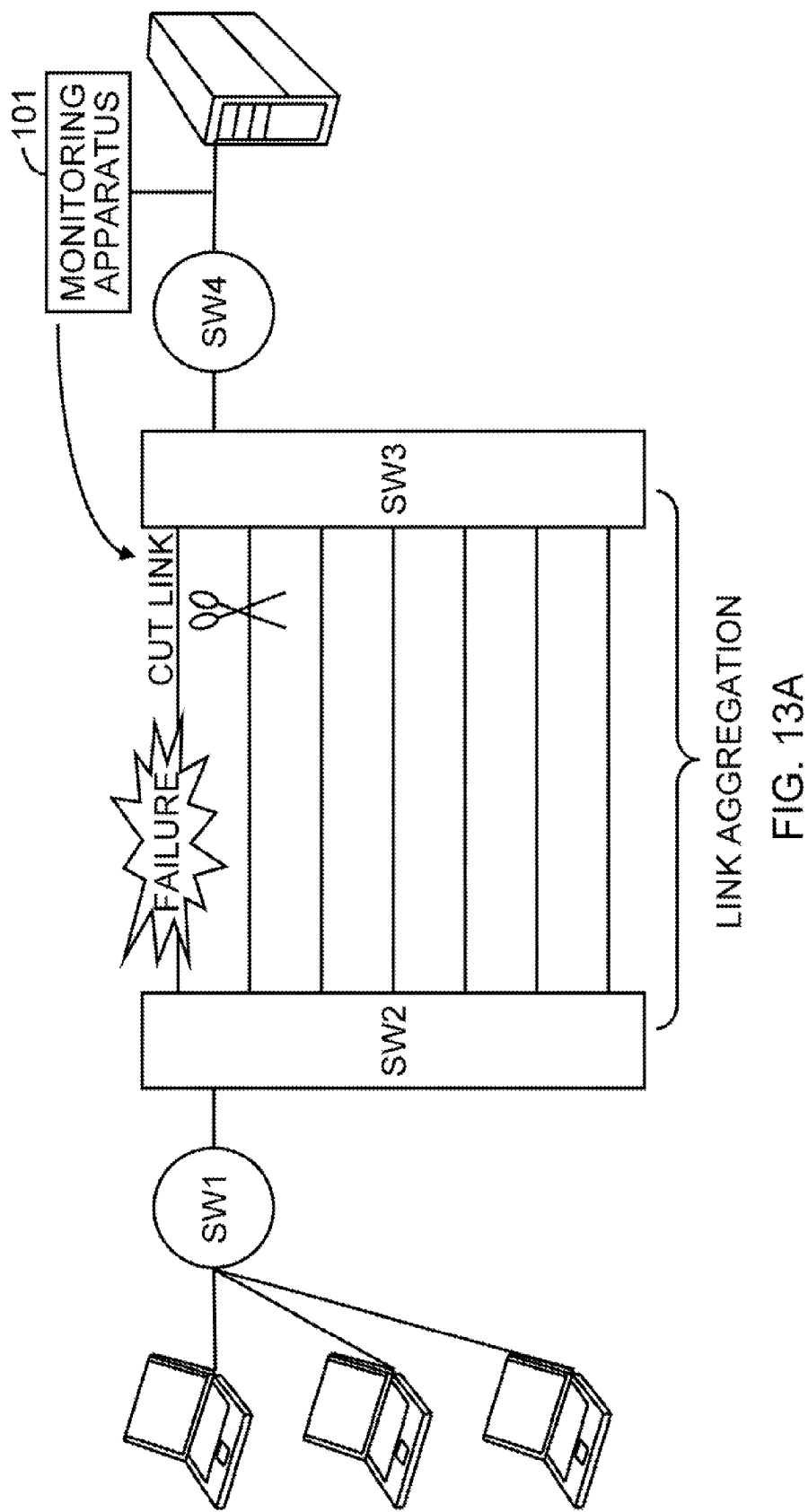

FIGS. 13A and 13B illustrate another exemplary process in which the monitoring apparatus 101 identifies which link in the link aggregation is in failure according to the present embodiment. The monitoring apparatus 101 instructs the switch SW2 to cut a link. Upon determining that the link has been cut, the monitoring apparatus 101 sorts measured data stored in the measured data table 202a so as to obtain the sorted data table 202b.

If the link having been cut is not in failure as illustrated in FIG. 13A, the remaining links include a failure link, and some packet passes through the failure link, resulting in being degraded in quality. Thus, as illustrated in FIG. 13B, the number of degraded segments in the sorted data table 202b is determined to be one after the link cut. That is, the number of failure links after the link cut is determined to be one.

Since the number of failure links before the link is cut stored in the storage device 202 is one in this case, the number of failure links does not change after the link cut. Thus, the monitoring apparatus 101 may determine that the link having been cut is not in failure.

A specific example of the process in which the monitoring apparatus 101 identifies which links in the link aggregation are in failure will be discussed with reference to FIGS. 14A, 14B, 15A, and 15B. In the following, it is supposed for simplicity that the sort rule is the first sort rule previously discussed (to divide a least significant byte of a source MAC address by the number of links in the link aggregation, and to sort measured data stored in the measured data table 202a into segments as many as the links).

FIGS. 14A and 14B illustrate an exemplary process in which the monitoring apparatus 101 identifies which links in the link aggregation are in failure according to the present embodiment. It is supposed, at this time, that two links in the link aggregation are in failure. The number of failure links is determined to be two before a link is cut on the basis of the number of degraded segments in the sorted data table 202b, and is stored in the storage device 202.

The monitoring apparatus 101 instructs the switch SW2 to cut a link so as to identify which link in the link aggregation is in failure. Upon determining that the link has been cut, the monitoring apparatus 101 sorts measured data stored in the measured data table 202a so as to obtain the sorted data table 202b.

If the link having been cut is in failure as illustrated in FIG. 14A, the remaining links include one failure link, and some packet passes through the failure link, resulting in being degraded in quality. Thus, as illustrated in FIG. 14B, the number of degraded segments in the sorted data table 202b is determined to be one after the link cut. That is, the number of failure links after the link cut is determined to be one.

Since the number of failure links before the link is cut stored in the storage device 202 is two in this case, the number of failure links decreases after the link cut. Thus, the monitoring apparatus 101 may determine that the link having been cut is in failure.

Figure 15A:
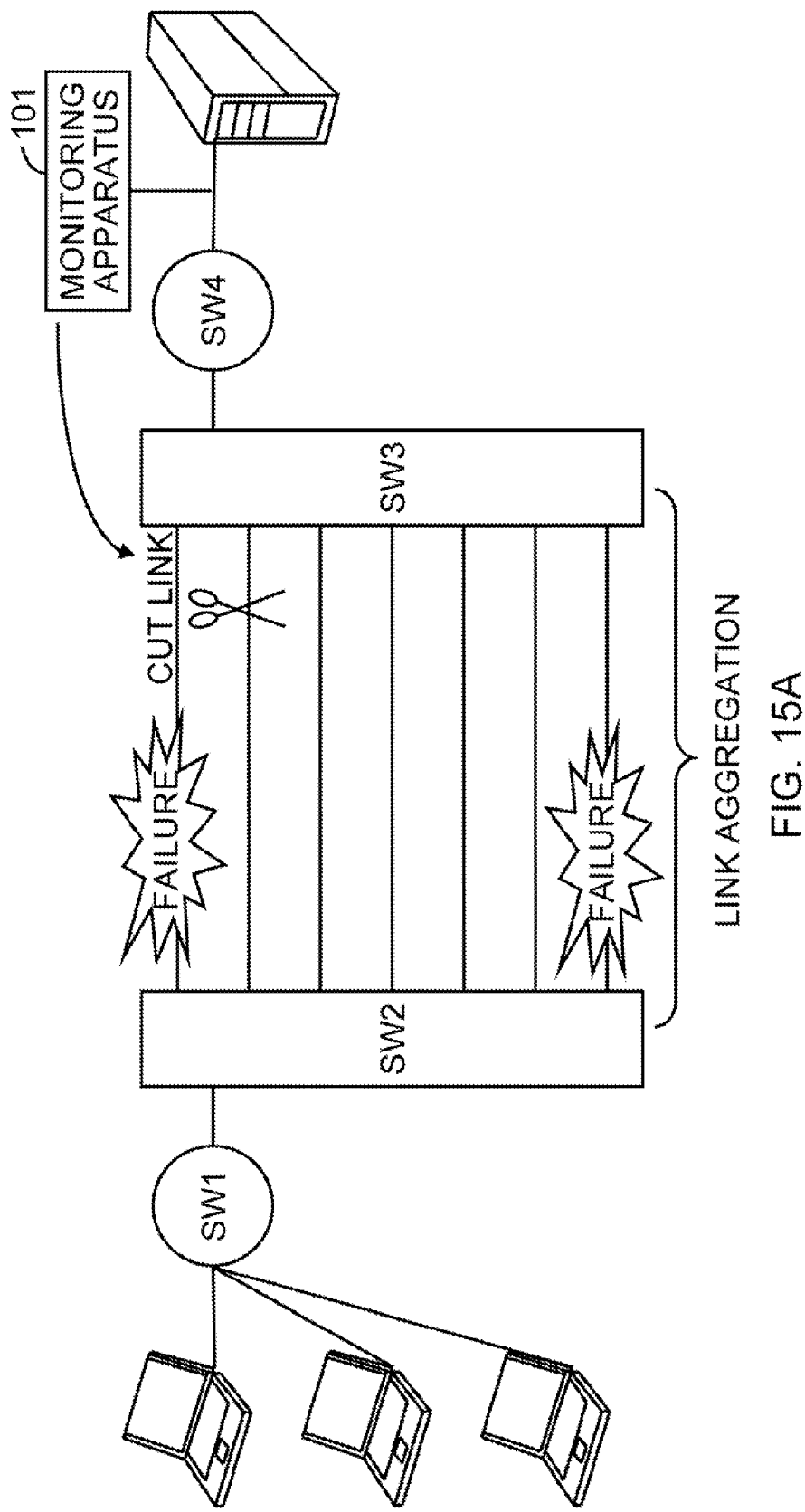

FIGS. 15A and 15B illustrate another exemplary process in which the monitoring apparatus 101 identifies which links in the link aggregation are in failure according to the present embodiment. It is supposed, at this time, that two links in the link aggregation are in failure. The number of failure links is determined to be two before a link is cut on the basis of the number of degraded segments in the sorted data table 202b, and is stored in the storage device 202.

If the link having been cut is not in failure as illustrated in FIG. 15A, the remaining links include two failure links and some packet passes through the failure links, resulting in being degraded in quality. Thus, as illustrated in FIG. 15B, the number of degraded segments in the sorted data table 202b is determined to be two after the link cut. That is, the number of failure links after the link cut is determined to be two.

Since the number of failure links before the link is cut stored in the storage device 202 is two at this time, the number of failure links does not change after the link cut. Thus, the monitoring apparatus 101 may determine that the link having been cut is not in failure.

According to the embodiment discussed above, if a failure occurs in the network, the monitoring apparatus 101 automatically tries all the sort rules in this way so as to identify the allotment rule for allotting packets employed in the switch. Thus, even without learning the allotment rule employed in the switch, the monitoring apparatus 101 may start a process for identifying a failure link in a link aggregation by using a sort rule corresponding to the allotment rule employed in the switch.

As the monitoring apparatus 101 obtains information on network topology and sorts measured data of each packet obtained from captured packets, the monitoring apparatus 101 may determine the number of failure links from the sort result. The monitoring apparatus 101 may determine whether the failure link is in the link aggregation or not. Thus, even without storing information on network topology all the time, the monitoring apparatus 101 may automatically obtain information on network topology, identify a failure which has occurred in the link aggregation and start a process for identifying a failure link.

If links in the link aggregation are in failure, the monitoring apparatus 101 stores the number of failure links before a link is cut in the storage device 202. Then, the monitoring apparatus 101 cuts a link in the link aggregation so as to identify a failure link in the link aggregation. Since the monitoring apparatus 101 sorts measured data of each packet after the link cut in accordance with the sort rule and determines the number of failure links after the link cut on the basis of the sort result, the monitoring apparatus 101 may quickly and easily identify the failure link on the basis of the numbers of failure links before and after the link cut. Even if a plurality of links are in failure, the monitoring apparatus 101 may identify all failure links.

Since the monitoring apparatus 101 outputs information on the identified failure link to the display device 204, a system administrator may exchange only the outputted failure link so as to maintain the network. Thus, the system administrator need not worry about an erroneous exchange of a normal link, and time required for network maintenance may be shortened.

Further, if only one link in the link aggregation is in failure, the monitoring apparatus 101 may identify the failure link according to whether a failure link remains after a link is cut without reference to the number of failure links before the link is cut, and may thereby accelerate the process for identifying a failure link. Time required for network maintenance may thereby be further shortened.

According to conventional techniques, a monitoring apparatus monitors traffic in each switch so as to identify a failure link in a link aggregation. Specifically, the monitoring apparatus of conventional techniques refers to an MIB counter related to a lost packet for each interface of each switch, so as to identify a failure link.

Since the monitoring apparatus has to calculate a difference between the values indicated by the MIB counter in order to utilize the MIB counter for each interface of each switch, the monitoring apparatus of conventional techniques needs to regularly refers to MIBs. Thus, the monitoring apparatus of conventional techniques may not identify a failure link upon failing to refer to MIBs.

The monitoring apparatus 101 of the embodiments may identify a failure link in the link aggregation, without regularly referring to MIBs, on the basis of the numbers of failure links before and after a link is cut. Thus, the monitoring apparatus 101 may save time required for referring to MIBs and prevent load put on the communication channel caused by MIB reference.

The monitoring method discussed above may be implemented by making a computer such as a personal computer or a workstation execute a prepared program. The monitoring program is recorded on a computer-readable recording medium such as a hard disk, a flexible disk, a compact disc read-only memory (CD-ROM), a magneto-optical disc (MO), a digital versatile disc (DVD), etc. and is read from the recording medium and executed by the computer. Further, the monitoring program may be distributed through a network such as the Internet.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been discussed in detail, it should be understood that the various changes, substitutions, and alterations could be made hereto without departing from the spirit and scope of the invention.

What is claimed is:

1. A computer-readable, non-transitory medium storing a program that causes a computer to execute a monitoring method comprising:
   detecting a cut link, the cut link being among a plurality of links forming a link aggregation;
   counting lost packets related to remaining links in the plurality of links excluding the cut link to obtain a first lost packet count for each first address included in packets passed through the remaining links;
   sorting the first lost packet counts into first segments corresponding to the remaining links;
   determining degradation in quality for each first segment on the basis of the first lost packet counts sorted into the first segments;
   determining whether the cut link is in failure on the basis of the determined degradation in quality for each first segment;
   outputting a determination result of whether the cut link is in failure;
   counting, before detecting the cut link, lost packets related to the plurality of links to obtain a second lost packet count for each second address included in packets passed through the plurality of links;
   sorting the second lost packet counts into second segments corresponding to the plurality of links; and
   determining degradation in quality for each second segment on the basis of the second lost packet counts sorted into the second segments,
   wherein
   the computer determines whether the cut link is in failure on the basis of the determined degradation in quality for each first segment and the determined degradation in quality for each second segment.

2. The computer-readable, non-transitory medium according to claim 1, wherein the first address is a source address included in each of the packets passed through the remaining links.

3. The computer-readable, non-transitory medium according to claim 1, wherein the first address is a destination address included in each of the packets passed through the remaining links.

4. The computer-readable, non-transitory medium according to claim 1, wherein the computer determines that the cut link is in failure when all the first segments are determined to be normal.

5. The computer-readable, non-transitory medium according to claim 1, wherein the computer determines that the remaining links include a link in failure when one of the first segments is determined to be degraded.

6. The computer-readable, non-transitory medium according to claim 1, wherein the second address is a source address included in each of the packets passed through the plurality of links.

7. The computer-readable, non-transitory medium according to claim 1, wherein the second address is a destination address included in each of the packets passed through the plurality of links.

8. The computer-readable, non-transitory medium according to claim 1, wherein the computer determines that the plurality of links include no link in failure when all the second segments are determined to be degraded.

9. A monitoring apparatus comprising:
   a processor to:
   detect a cut link, the cut link being among a plurality of links forming a link aggregation;
   count lost packets related to remaining links in the plurality of links excluding the cut link to obtain a first lost packet count for each first address included in packets passed through the remaining links;
   sort the first lost packet counts into first segments corresponding to the remaining links;
   determine degradation in quality for each first segment on the basis of the first lost packet counts sorted into the first segments;
   determine whether the cut link is in failure on the basis of the determined degradation in quality for each first segment;
   output a determination result of whether the cut link is in failure;
   counts, before detecting the cut link, lost packets related to the plurality of links to obtain a second lost packet count for each second address included in packets passed through the plurality of links;
   sorts the second lost packet counts into second segments corresponding to the plurality of links; and
   determines degradation in quality for each second segment on the basis of the second lost packet counts sorted into the second segments,
   wherein
   the processor determines whether the cut link is in failure on the basis of the determined degradation in quality for each first segment and the determined degradation in quality for each second segment.

10. The monitoring apparatus according to claim 9, wherein the first address is a source address included in each of the packets passed through the remaining links.

11. The monitoring apparatus according to claim 9, wherein the first address is a destination address included in each of the packets passed through the remaining links.

12. The monitoring apparatus according to claim 9, wherein the second address is a source address included in each of the packets passed through the plurality of links.

13. The monitoring apparatus according to claim 9, wherein the second address is a destination address included in each of the packets passed through the plurality of links.

14. A monitoring method executed by a monitoring apparatus, the monitoring method comprising:
   detecting, by the monitoring apparatus, a cut link, the cut link being among a plurality of links forming a link aggregation;
   counting lost packets related to remaining links in the plurality of links excluding the cut link to obtain a first lost packet count for each first address included in packets passed through the remaining links;
   sorting the first lost packet counts into first segments corresponding to the remaining links;
   determining degradation in quality for each first segment on the basis of the first lost packet counts sorted into the first segments;
   determining whether the cut link is in failure on the basis of the determined degradation in quality for each first segment;
   outputting a determination result of whether the cut link is in failure;
   counting, before detecting the cut link, lost packets related to the plurality of links to obtain a second lost packet count for each second address included in packets passed through the plurality of links;

sorting the second lost packet counts into second segments corresponding to the plurality of links; and determining degradation in quality for each second segment on the basis of the second lost packet counts sorted into the second segments, wherein the monitoring apparatus determines whether the cut link is in failure on the basis of the determined degradation in quality for each first segment and the determined degradation in quality for each second segment.

15. The monitoring method according to claim 14, wherein the first address is a source address included in each of the packets passed through the remaining links.

16. The monitoring method according to claim 14, wherein the first address is a destination address included in each of the packets passed through the remaining links.

17. The monitoring method according to claim 14, wherein the second address is a source address included in each of the packets passed through the plurality of links.

18. The monitoring method according to claim 14, wherein the second address is a destination address included in each of the packets passed through the plurality of links.

* * * * *